US012255426B2

(12) United States Patent
Choi

(10) Patent No.: US 12,255,426 B2
(45) Date of Patent: Mar. 18, 2025

(54) ADAPTER FOR TRAVEL WITH MULTI-PLUG FUNCTIONALITY FEATURING REDUCED DIMENSION

(71) Applicant: HYPHENATE INC., Seoul (KR)

(72) Inventor: Min-Kyu Choi, London (GB)

(73) Assignee: HYPHENATE INC., Seoul (KR)

( * ) Notice: Subject to any disclaimer, the term of this patent is extended or adjusted under 35 U.S.C. 154(b) by 487 days.

(21) Appl. No.: 17/627,510

(22) PCT Filed: Jul. 15, 2020

(86) PCT No.: PCT/EP2020/070061
§ 371 (c)(1),
(2) Date: Jan. 14, 2022

(87) PCT Pub. No.: WO2021/009265
PCT Pub. Date: Jan. 21, 2021

(65) Prior Publication Data
US 2022/0320809 A1 Oct. 6, 2022

(30) Foreign Application Priority Data
Jul. 15, 2019 (GB) ...................................... 1910099

(51) Int. Cl.
*H01R 31/06* (2006.01)
*H01R 13/629* (2006.01)
*H01R 27/00* (2006.01)

(52) U.S. Cl.
CPC ........... *H01R 31/06* (2013.01); *H01R 13/629* (2013.01); *H01R 27/00* (2013.01)

(58) Field of Classification Search
CPC ....... H01R 31/06; H01R 13/629; H01R 27/00
(Continued)

(56) References Cited

U.S. PATENT DOCUMENTS 6,062,884 A 5/2000 Messimer et al.
6,382,996 B1 5/2002 Eyman
(Continued)

FOREIGN PATENT DOCUMENTS

AU 8538472 A * 8/1985 ............. H01R 31/06
CN 201113103 Y * 9/2008
(Continued)

OTHER PUBLICATIONS

United Kingdom search report for GB Application No. 1910099.9 issued Oct. 16, 2023.
(Continued)

*Primary Examiner* — Peter G Leigh
(74) *Attorney, Agent, or Firm* — Kim IP Law Group LLC

(57) ABSTRACT

There is provided a multi-plug adapter comprising: a type-C pin assembly comprising pins and a pin support body; at least one additional pin assembly comprising a different pin arrangement; a housing for housing the pin assemblies, wherein the housing comprises a plurality of holes in a first face allowing deployment of the selected pins therethrough; an actuation mechanism cooperable with each pin assembly, wherein the actuation mechanism is adapted to selectively move each pin assembly between a stowed configuration in which the pins are stowed within the housing and a deployed configuration in which the pins protrude through the respective holes in the first face of the housing and are engageable in a complementary socket; an electrical output, wherein the electrical output is electrically connected to each pin assembly in the deployed configuration; and wherein the type-C pins are at least partially located within the pin support body in the stowed configuration and wherein the type-C pins and pin support body are simultaneously movable between the stowed and deployed configurations.

36 Claims, 22 Drawing Sheets

(58) Field of Classification Search
USPC .......................................................... 439/151
See application file for complete search history.

(56) References Cited

U.S. PATENT DOCUMENTS

| | | | | |
|---|---|---|---|---|
| 7,220,139 | B1 | 5/2007 | Chang et al. | |
| 8,182,276 | B2 * | 5/2012 | Ruffner .................. | H01R 24/22 439/172 |
| 8,976,541 | B2 * | 3/2015 | Ballard .................... | H02G 3/18 361/822 |
| 2007/0293072 | A1 * | 12/2007 | Honton .................. | H01R 27/00 439/159 |
| 2011/0097915 | A1 * | 4/2011 | Ruffner .................. | H01R 24/22 439/174 |
| 2013/0058012 | A1 * | 3/2013 | Ballard .................... | H02G 3/18 361/622 |

FOREIGN PATENT DOCUMENTS

| | | | | | |
|---|---|---|---|---|---|
| CN | 101394051 | A | * | 3/2009 | ......... H01R 13/4534 |
| CN | 101872911 | | | 10/2010 | |
| CN | 101872911 | A | * | 10/2010 | |
| CN | 207217824 | U | * | 4/2018 | ............. H01R 13/02 |
| CN | 207896327 | | | 9/2018 | |
| CN | 208014943 | | | 10/2018 | |
| DE | 102011014920 | A1 | * | 9/2012 | ............. H01R 27/00 |
| WO | 02063722 | A2 | | 6/2002 | |
| WO | WO-2006114035 | A1 | * | 11/2006 | ............. H01R 27/00 |
| WO | 2018083129 | A1 | | 5/2018 | |
| WO | WO-2018083134 | A1 | * | 5/2018 | ........... H01R 13/652 |

OTHER PUBLICATIONS

United Kingdom search report for GB Application No. 1910099.9 issued Mar. 28, 2023.
International Search Report for International Application No. PCT/EP2020/070061 dated Jan. 10, 2020.
Written Opinion for International Search Report for International Application No. PCT/EP2020/070061 dated Jan. 10, 2020.
United Kingdom Search Report for GB Application No. 1910099.9, Dec. 23, 2020.
European Patent Office, Communication pursuant to Article 94(3) EPC, dated Dec. 13, 2022 in European Application No. 20743991.0-1201.

* cited by examiner 10
13
50
60
43

+

=

Pull out / Anticlockwise rotation

Push in / Clockwise rotation

Unlocked
Locked
13
20
49
24
25
67
60
64
22
26
23

Figure 19
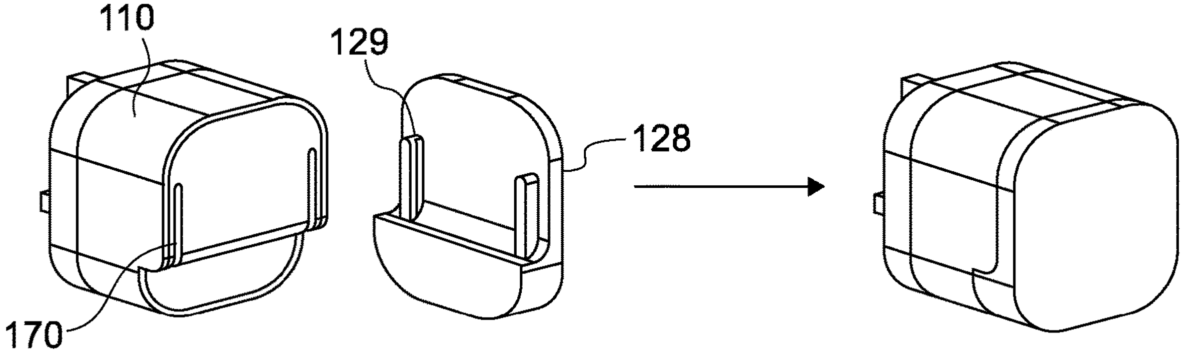
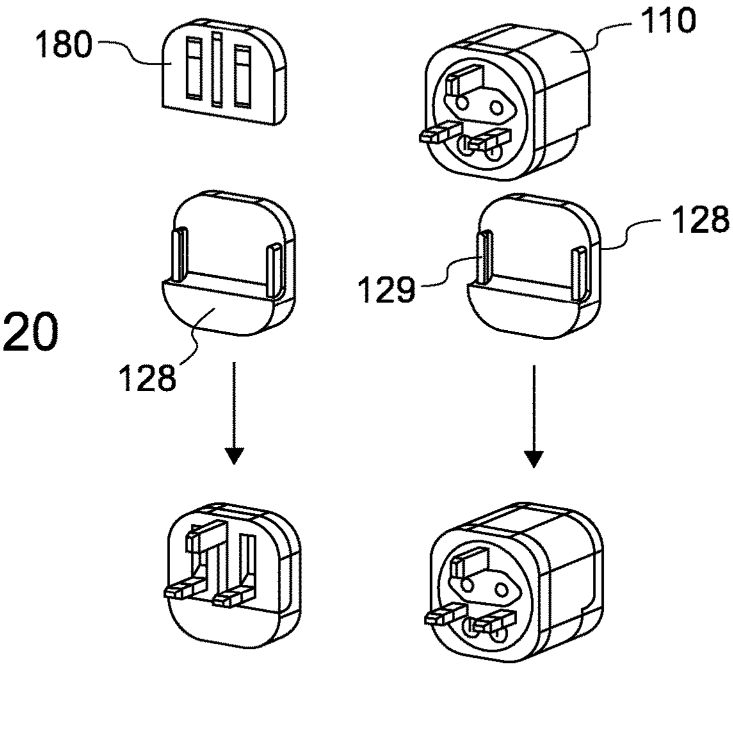
Figure 20

ADAPTER FOR TRAVEL WITH MULTI-PLUG FUNCTIONALITY FEATURING REDUCED DIMENSION

The present invention relates to a multi-plug adapter, particularly, but not exclusively, a travel adapter with reduced dimensions and multi-plug pin assemblies for fitting different regional socket types.

In an increasingly digital world, travellers often have several electronic devices requiring power. Different countries and geographical regions have distinct types of plug and socket assemblies for accessing a power source. Travellers can use a multi-plug power adapter having several specific selectable pin types for accessing power from electric sockets in these different countries or regions of the world. Minimising the size of such a travel adapter is desirable to improve space efficiency and reduce manufacture and distribution costs. The size of conventional multi-plug travel adapters is typically dictated by the length of European (or type-C) pins and pin housing, which are required for use in European recessed pin sockets. The type-C pins and pin housing have the longest dimensions of all the commonly used pin assemblies. Therefore, the type-C pin and housing assembly impose a design constraint on existing multi-plug travel adapters resulting in an overall adapter length greater than the length of the type-C pin and housing assembly.

In view of the above, it is an object of the present invention to provide a travel adapter with reduced dimensions.

According to a first aspect of the invention, there is provided a multi-plug adapter comprising:

- a type-C pin assembly comprising pins and a pin support body;
- at least one additional pin assembly comprising a different pin arrangement;
- a housing for housing the pin assemblies, wherein the housing comprises a plurality of holes in a first face allowing deployment of the selected pins therethrough;
- an actuation mechanism cooperable with each pin assembly, wherein the actuation mechanism is adapted to selectively move each pin assembly between a stowed configuration in which the pins are stowed within the housing and a deployed configuration in which the pins protrude through the respective holes in the first face of the housing and are engageable in a complementary socket;
- an electrical output, wherein the electrical output is electrically connected to each pin assembly in the deployed configuration; and
- wherein the type-C pins are at least partially located within the pin support body in the stowed configuration and wherein the type-C pins and pin support body are simultaneously movable between the stowed and deployed configurations.

Optionally, the type-C pins and pin support body are movable in tandem between the stowed and deployed configurations. Thus, the present invention provides tandem movement of the type-C pins and pin support body, enabling the type-C pins to be housed within the pin support body, thereby advantageously reducing overall dimensions of the multi-plug adapter.

Optionally, the multi-plug adapter comprises at least three different pin assemblies.

Optionally, the multi-plug adapter comprises four different pin assemblies.

Optionally, the type-C pin assembly may be used in combination with complementary sockets in Europe and European countries, as well as China.

Optionally, the at least one different pin assembly comprises a type-G pin assembly. The type-G pin assembly may be used in combination with complementary sockets in the UK.

Optionally the multi-plug adapter further comprises a type-A pin assembly. Optionally, the multi-plug adapter further comprises a type-I pin assembly. Optionally, the type-A pin assembly comprises pins that are rotatable to create a type-I pin assembly. The type-A pin assembly may be used in conjunction with complementary sockets in North America and China. The type-I pin assembly may be used with complementary sockets in Australasia and China.

Alternatively, the multi-plug adapter may comprise other types of pin assemblies and/or other pin assemblies may be substituted for the one or more pin assemblies listed above.

Optionally, the housing is substantially cuboid in shape with rounded edges. Optionally, the housing is made from moulded plastic.

Optionally, the housing has a length less than around 40 mm when the pin assemblies are in the stowed configuration. Optionally, the housing has a length less than around 35 mm when the pin assemblies are in the stowed configuration. Optionally, the housing has a length less than around 32 mm when the pin assemblies are in the stowed configuration. Optionally, the housing has a length less than 30 mm when the pin assemblies are in the stowed configuration.

Optionally, the type-C pins are located within the pin support body in the stowed configuration. Optionally, the pin support body has holes within a leading face and the type-C pins are movable within the holes.

Optionally, the actuation mechanism comprises a cam cooperable with each pin assembly. Optionally, the actuation mechanism is arranged such that movement of the cam causes selective movement of the cooperable pin assembly.

Optionally, the actuation mechanism is arranged such that movement of the cam causes selective movement of each cooperable pin assembly in a different orientation. Optionally, the cam and pin assemblies are arranged and located such that the cam is cooperable with each pin assembly within a different 90 degree arc.

Optionally, the actuation mechanism comprises a cam having an angled cam surface and a protrusion coupled to each pin assembly such that each protrusion is arranged to cooperate with the angled cam surface in a particular orientation to cause selective movement of each pin assembly between the stowed and the deployed configurations.

Optionally, the angled cam surface has an inclined surface to guide each protrusion and coupled pin assembly from the stowed to the deployed configuration. Optionally, the angled cam surface has a declined surface to guide each protrusion and coupled pin assembly from the deployed to the stowed configuration.

Optionally, the actuation mechanism comprises an actuator to initiate actuation and movement between the stowed and the deployed configurations. Optionally, the actuator and/or the cam are selectively engageable with each pin assembly.

Optionally, the actuator comprises a rotatable member coupled to the cam. Optionally, the actuator comprises a portion of rotatable housing. Optionally, the actuator and attached cam are engageable with a protrusion of a respective pin assembly at 90 degree intervals.

Alternatively, the actuation mechanism comprises an actuator coupled to a portion of each pin assembly, wherein the actuator is slidable within a slot located in the housing, to move each pin assembly between the stowed and deployed configurations. Optionally, the actuator is a slidable lever that is directly coupled to a respective pin assembly, such that linear movement of the slidable lever causes corresponding linear movement of the coupled pin assembly.

Optionally, the actuation mechanism further comprises a type-C pin deployment means. Optionally, the type-C pin deployment means comprise a pin deployment member rotatably coupled to the type-C pins within the pin support body. Optionally, the pin deployment member is rotatable within the pin support body such that rotation of the pin deployment member causes linear movement of the pins. Optionally, the pin deployment member is coupled to a helical shaft fixed within the adapter housing such that linear movement of the pin support body causes rotation of the pin deployment member within the pin support body.

Optionally, the type-C pin deployment means is arranged such that actuation of the actuation mechanism to deploy the type-C pins causes linear outward movement of the pin support body, which in turn causes rotation of the pin deployment member attached to the type-C pins to thereby cause simultaneous linear outward movement of the type-C pins and the pin support body.

Optionally, the type-C pin deployment means may comprise a worm gear assembly coupled to the type-C pins and the pin support body. The worm gear assembly may comprise a shaft with a helical thread fixed within the adapter housing. The worm gear assembly may comprise an external worm gear rotatably held within the pin support body.

Alternatively, the actuation mechanism comprises a type-C pin deployment means including a double helix screw member located within the pin support body and rotatably coupled to the type-C pins such that the pin support body and type-C pins are deployable in tandem. Optionally, the type-C pin deployment means comprises a cylindrical shaft fixed within the adapter housing and a double helix screw embedded in a worm gear that is arranged to translate along the cylindrical shaft.

Optionally, the type-C deployment means comprises a type-C locking portion arranged to substantially restrict retraction of the type-C pins and/or the pin support body on application of an external force in use. Optionally, the type-C locking portion comprises at least one stop member to substantially restrict rotation of the type-C deployment means and retraction of the type-C pins and/or the support body on application of an external force. Optionally, the stop member can comprise interacting locking surfaces to substantially restrict rotation of the type-C pin deployment member and hence substantially restrict retraction of the type-C pins on application of an external force. Optionally, the multi-plug adapter further comprises a locking mechanism. Optionally, the locking mechanism is arranged to lock at least one of the pin assemblies in the deployed configuration. Optionally, the locking mechanism is biased to lock at least one of the pin assemblies in the deployed configuration. Optionally, the locking mechanism is arranged such that movement of at least one of the pin assemblies into the deployed configuration automatically causes actuation of the locking mechanism.

Optionally, the locking mechanism comprises two locking shutters to each lock a respective pin assembly in the deployed configuration. Optionally, the locking mechanism comprises an actuator key to prevent or allow engagement of the locking mechanism.

Optionally, the actuator key is cooperable with the shutters to prevent or allow movement of the shutters. Optionally, the shutters are biased towards the locking position and deployment of the respective pin assemblies and removal of the key enables the respective shutter to lock behind the pin assembly.

Optionally, the multi-plug adapter comprises an indictor to enable a user to identify when each of the pin assemblies is in a fully deployed configuration. Optionally, the multi-plug adapter comprises a visual indictor. Optionally the multi-plug adapter comprises a haptic indictor. The multi-plug adapter may comprise both a visual indictor and a haptic indicator.

Optionally, the indicator comprises a haptic feedback mechanism. Optionally, the haptic feedback mechanism is coupled to the actuation mechanism and provides sensory information once a pin assembly is in the stowed and/or the fully deployed configuration.

Optionally, the haptic feedback mechanism comprises at least one recess associated with each fully deployed and/or stowed configuration and a key biased towards the or each recess, wherein engagement of the key with the recess provides haptic feedback and confirmation of the fully deployed and/or stowed configurations for a user.

Optionally, the multi-plug adapter comprises a visual indicator in the form of a visible indicator applied to the housing and/or the actuation mechanism such that alignment of the visual indicator confirms when pins are in the fully deployed and/or the stowed configuration.

Optionally, the visual indicator comprises the portion of rotatable housing that is shaped to at least partially match a shape of the housing such that alignment of shaped housing and portion of rotatable housing signifies the pin assemblies are in the fully deployed and/or the stowed configurations. Alternatively, or additionally, the visual indicator comprises visual markers wherein alignment of the visual markers indicate that the adapter is in the fully deployed and/or the stowed configurations.

Optionally, the electrical output may comprise at least one output selected from the group including: an electrical connector, an electrical conduction means, a USB, a USB-C and any socket type. Thus, the output may provide an electrical connector that acts as a conduit for conduction of electric current and is provided to electrically connect the deployed pins of the multi-plug adapter to another device such as a power pack. Alternatively, the output may be a specific socket type.

According to a second aspect of the invention, there is provided a multi-plug adapter comprising:

- at least two different pin assemblies, each pin assembly adapted for insertion into a respective cooperable socket,
- a housing for housing the different pin assemblies, wherein the housing comprises a plurality of holes in a first face allowing deployment of the selected pin assembly therethrough;
- an actuation mechanism cooperable with each pin assembly, wherein the actuation mechanism is adapted to selectively move each pin assembly between a stowed configuration in which the pins are stowed within the housing and a deployed configuration in which the pins protrude through the respective holes in the first face of the housing;
- an output, wherein the output is electrically connected to each pin assembly in the deployed configuration; and
- wherein the dimensions of the adapter between the first face and the opposing face are less than 40 mm.

Optionally, the dimensions of the adapter between the first face and the opposing face are less than 38 mm. Optionally, the dimensions of the adapter between the first face and the opposing face are less than 36 mm. Optionally, the dimensions of the adapter between the first face and the opposing face are less than 34 mm. Optionally, the dimensions of the adapter between the first face and the opposing face are less than 32 mm. Optionally, the dimensions of the adapter between the first face and the opposing face are less than 30 mm. Optionally, the dimensions of the adapter between the first face and the opposing face are around 28 mm.

Optionally, one of the pin assemblies comprises pins and a pin support body. Such an arrangement may be required to plug pins into recessed safety sockets. Optionally, the pins are at least partially housed within the pin support body in the stowed configuration.

Optionally, one of the pin assemblies is a type-C pin assembly.

Optionally, the multi-plug adapter is a travel adapter.

Optionally, the multi-plug adapter has an electric output and an interconnecting means, wherein the interconnecting means enable interconnection of the adapter with a modular component. The modular component may comprise a power pack. The interconnecting means may be arranged to enable interconnection of the multi-plug adapter with modular components of different sizes.

Optionally, each modular component is provided with an electronic output, such as a USBC, USB, or other socket. Optionally, each modular component comprises an electronic processor. The electronic processor may be provided on a printed circuit board assembly (PCBA).

Optionally, each modular component is arranged with complementary interconnectors that are engageable with the interconnecting means of the multi-plug adapter. The interconnecting means of the multi-plug adapter and the interconnector of the modular component may comprise a key and slot mechanism. Optionally, the interconnecting means of the adapter and the interconnector of the modular component are arranged such that engagement of the interconnecting means and the interconnector simultaneously cause electrical continuity between the multi-plug adapter and the modular component.

Any feature or embodiment of any aspect of the invention is equally applicable to and may be combined with any other aspect of the invention where appropriate.

Further features and advantages of the first and second aspects of the present invention will become apparent from the claims and the following description.

Embodiments of the present invention will now be described by way of example only, with reference to the following diagrams, in which.

Figure 1:
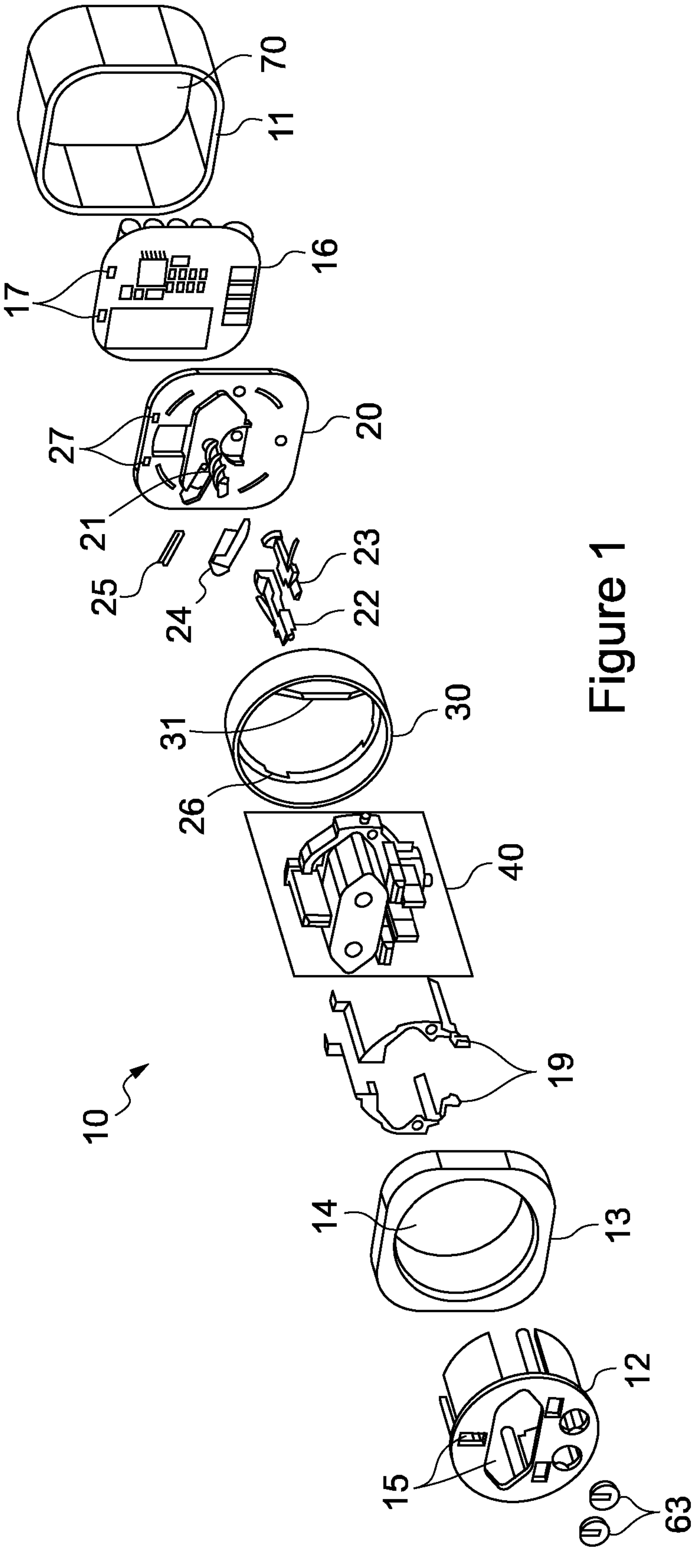
FIG. 1 is an exploded perspective view of one embodiment of a multi-plug adapter.
Figures 3A, 3B, 3C, 3D, 3E, 3F:
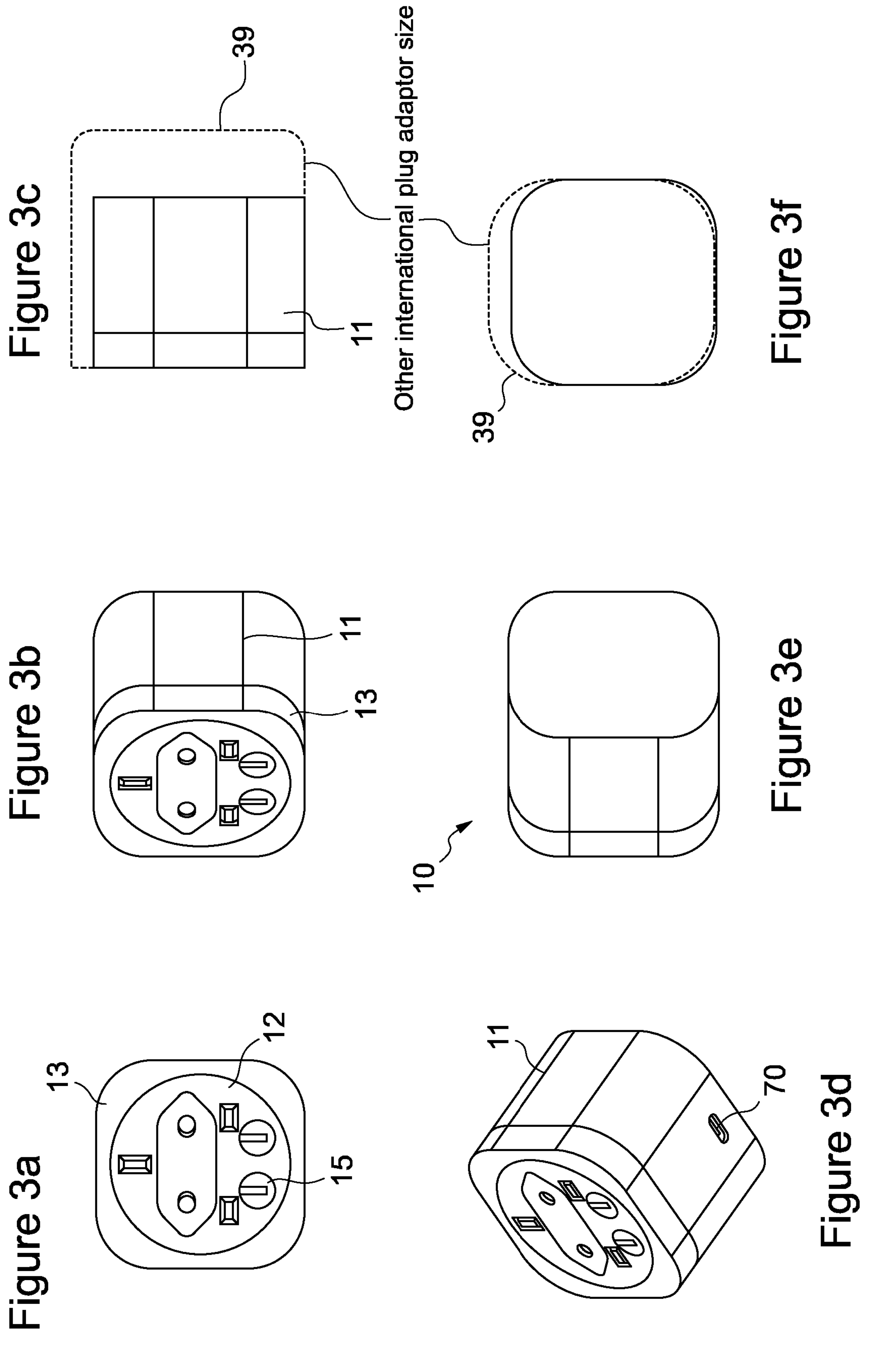
Figures 4A, 4B, 4C, 4D, 4E, 4F, 4G, 4H:
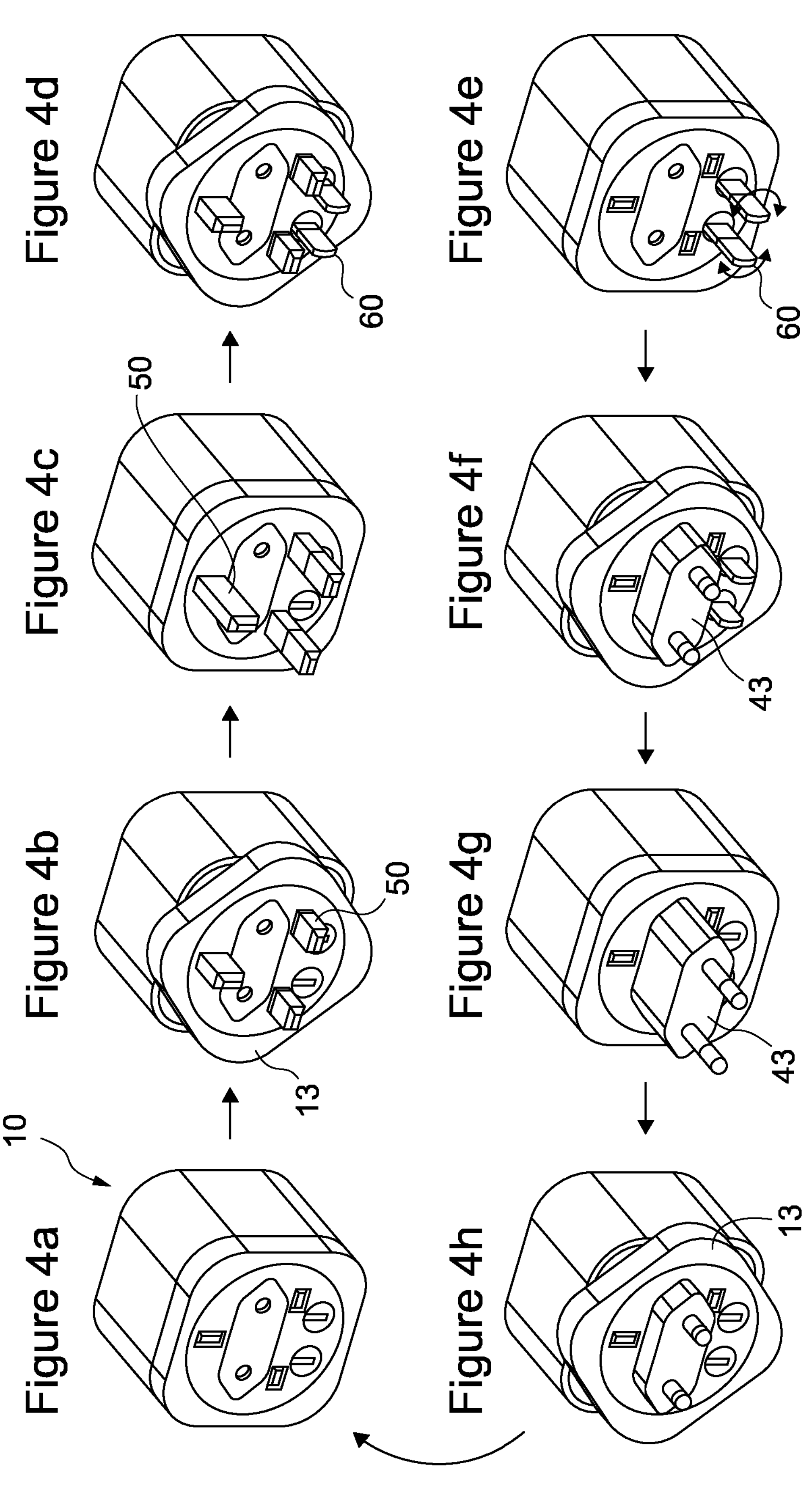
Figure 5:
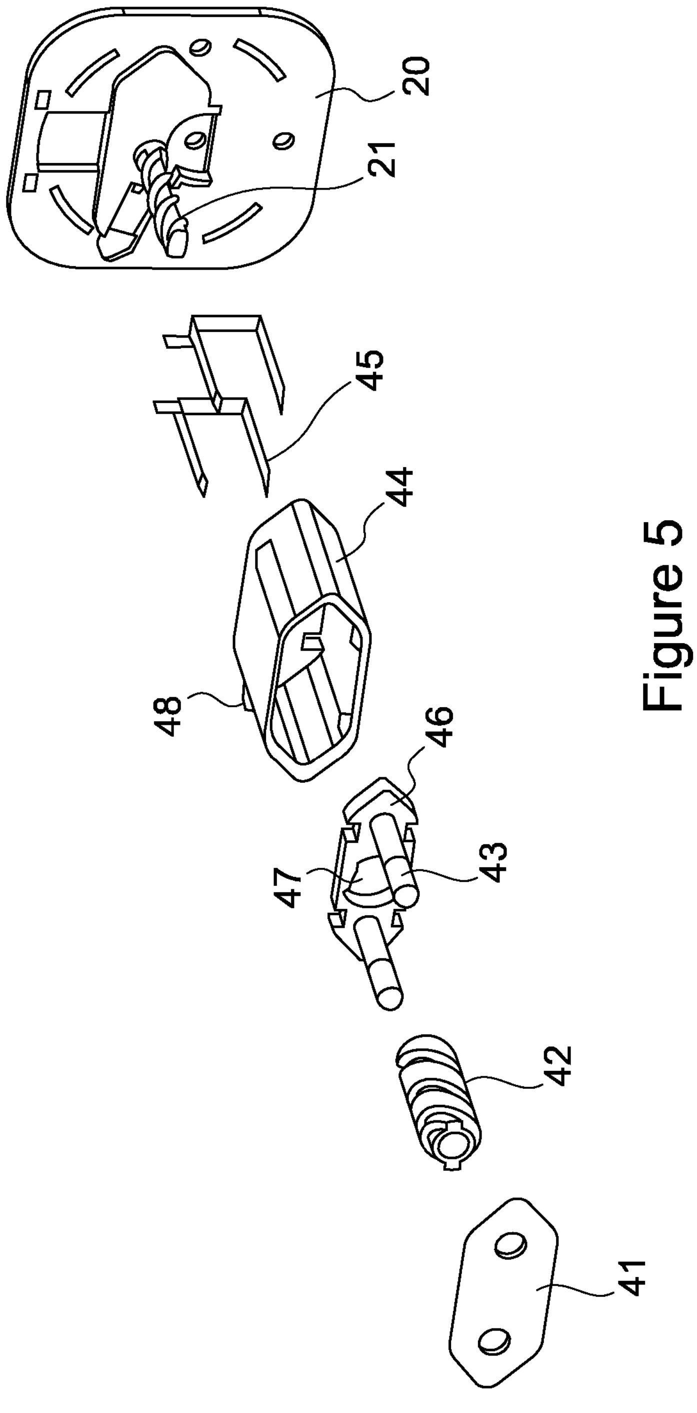
Figure 6A:
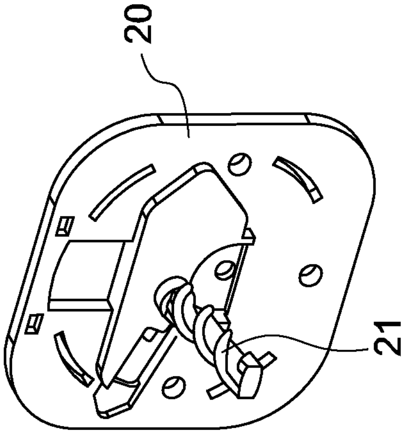
Figure 6B:
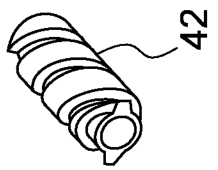
Figure 6C:
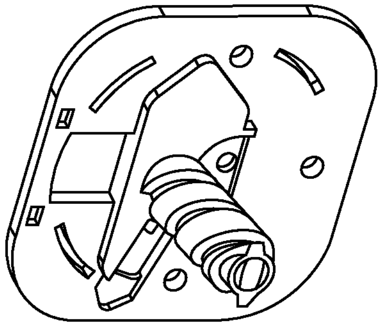

FIGS. 3*a*, 3*b*, 3*d* and 3*e* are front and perspective views of the assembled adapter of FIG. 1;

FIGS. 3*c* and 3*f* are side and rear views respectively, of the adapter housing showing an outline of a conventional adapter for dimensional comparison;

FIG. 4*a* is a perspective view of the adapter;

FIG. 4*b* is a perspective view of the adapter of FIG. 4*a*, with a rotatable housing rotated by 45 degrees and type-G pins emerging from the housing;

FIG. 4*c* is a perspective view of the adapter of FIG. 4*a*, with the rotatable housing rotated by 90 degrees and type-G pins in the deployed operational configuration;

FIG. 4*d* is a perspective view of the adapter of FIG. 4*a*, with the rotatable housing rotated by 135 degrees and type-G pins retracting and type-A pins emerging;

FIG. 4*e* is a perspective view of the adapter of FIG. 4*a*, with the rotatable housing rotated by 180 degrees and type-A pins in the deployed operational configuration;

FIG. 4*f* is a perspective view of the adapter of FIG. 4*a*, with the rotatable housing rotated by 225 degrees and type-A pins retracting and type-C pins emerging;

FIG. 4*g* is a perspective view of the adapter of FIG. 4*a*, with the rotatable housing rotated by 270 degrees and type-C pins in the deployed operational configuration;

FIG. 4*h* is a perspective view of the adapter of FIG. 4*a*, with the rotatable housing rotated by 315 degrees and type-C pins retracting to the stowed configuration;

FIG. 5 is an exploded view of the type-C pin assembly;

FIG. 6*a* is a perspective view of an internal cover and helical shaft;

FIG. 6*b* is a perspective view of an external worm gear;

FIG. 6*c* is a perspective view of an assembled worm gear assembly of FIGS. 6*a* and *b;*

Figure 6D:
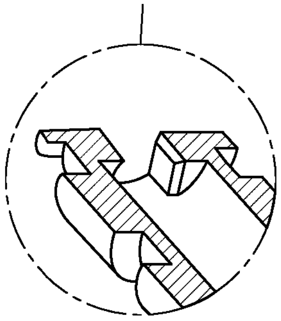
Figure 6E:
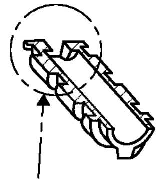
Figure 6F:
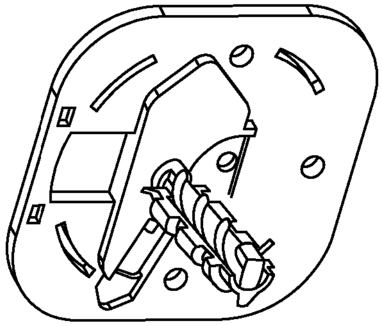
Figure 7A:
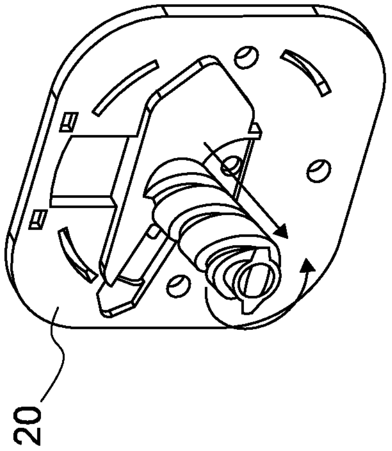
Figure 8A:
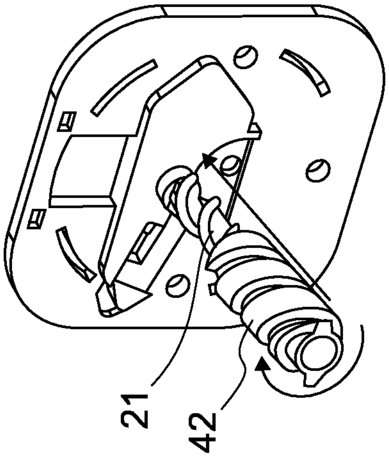
Figure 7B:
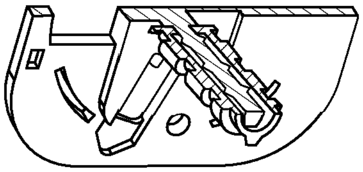
Figure 8B:
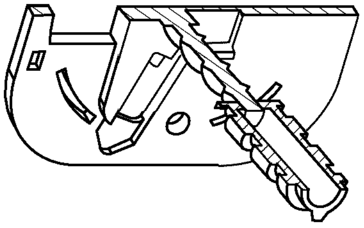
Figure 9A:
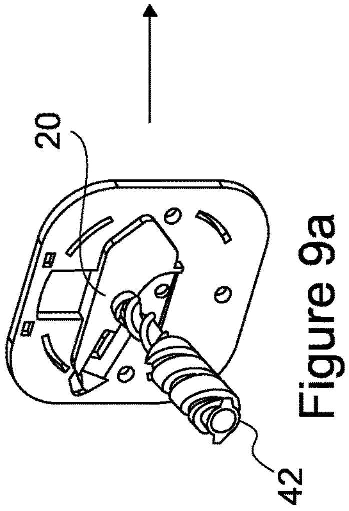
Figure 9B:
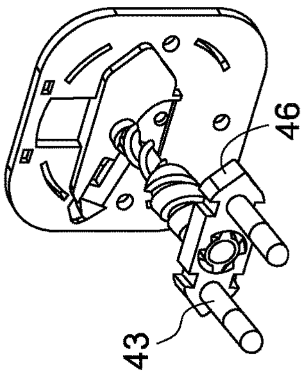
Figure 9C:
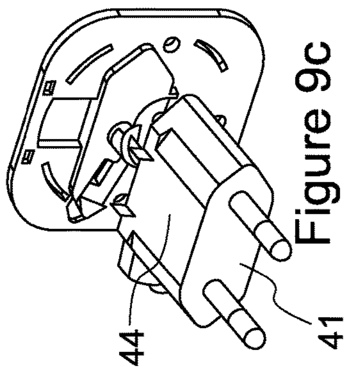
Figure 10A:
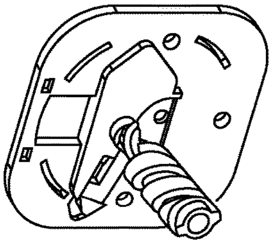
Figure 10B:
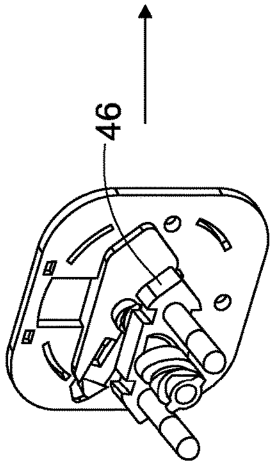
Figure 10C:
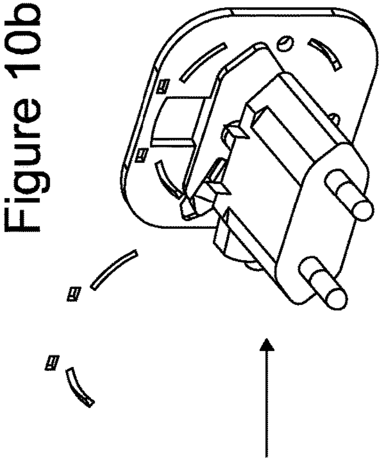
Figure 11A:
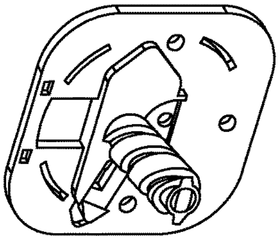
Figure 11B:
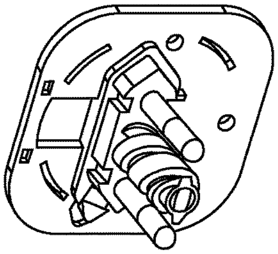
Figure 11C:
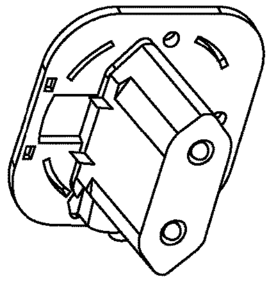
Figure 12:
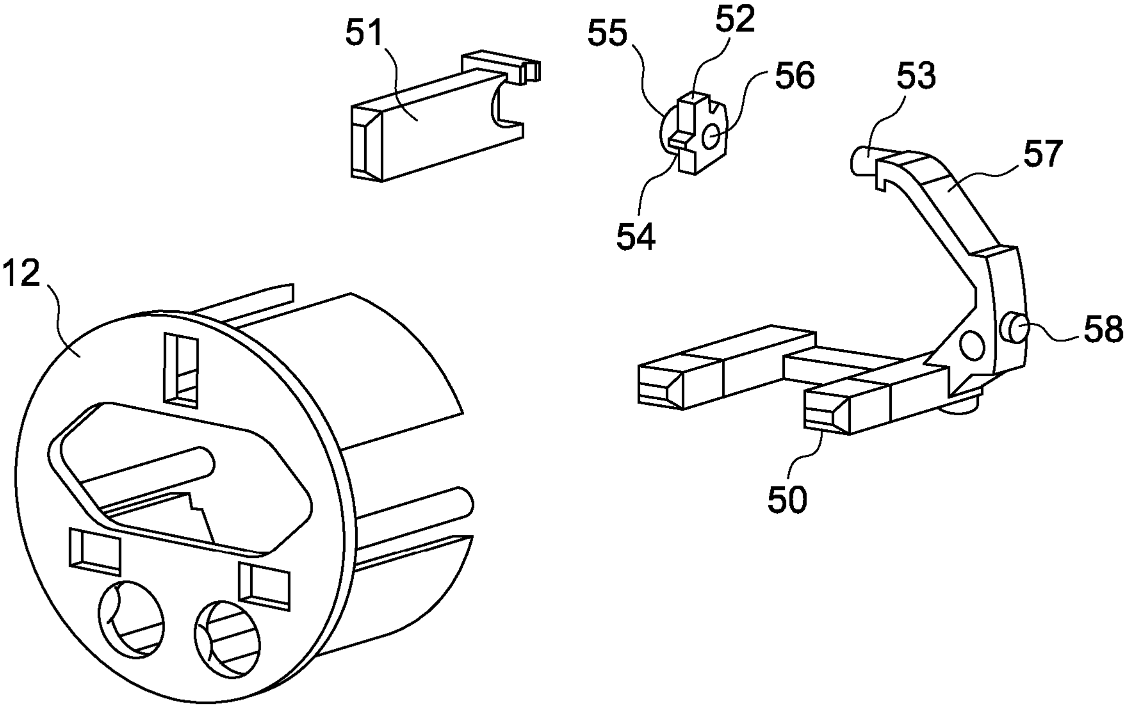
Figures 14A, 14B, 14C, 15A, 15B, 15C:
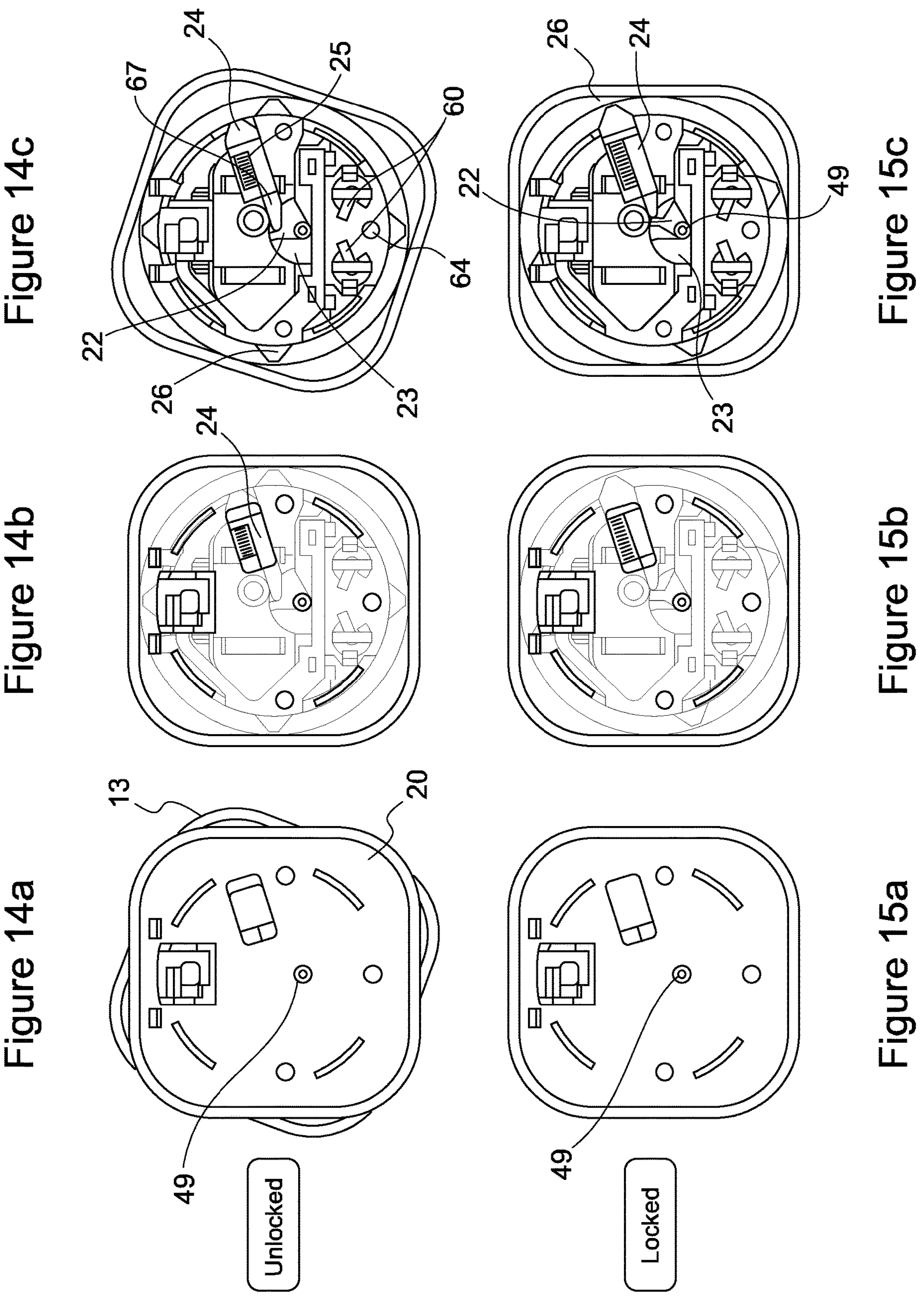
Figure 16:
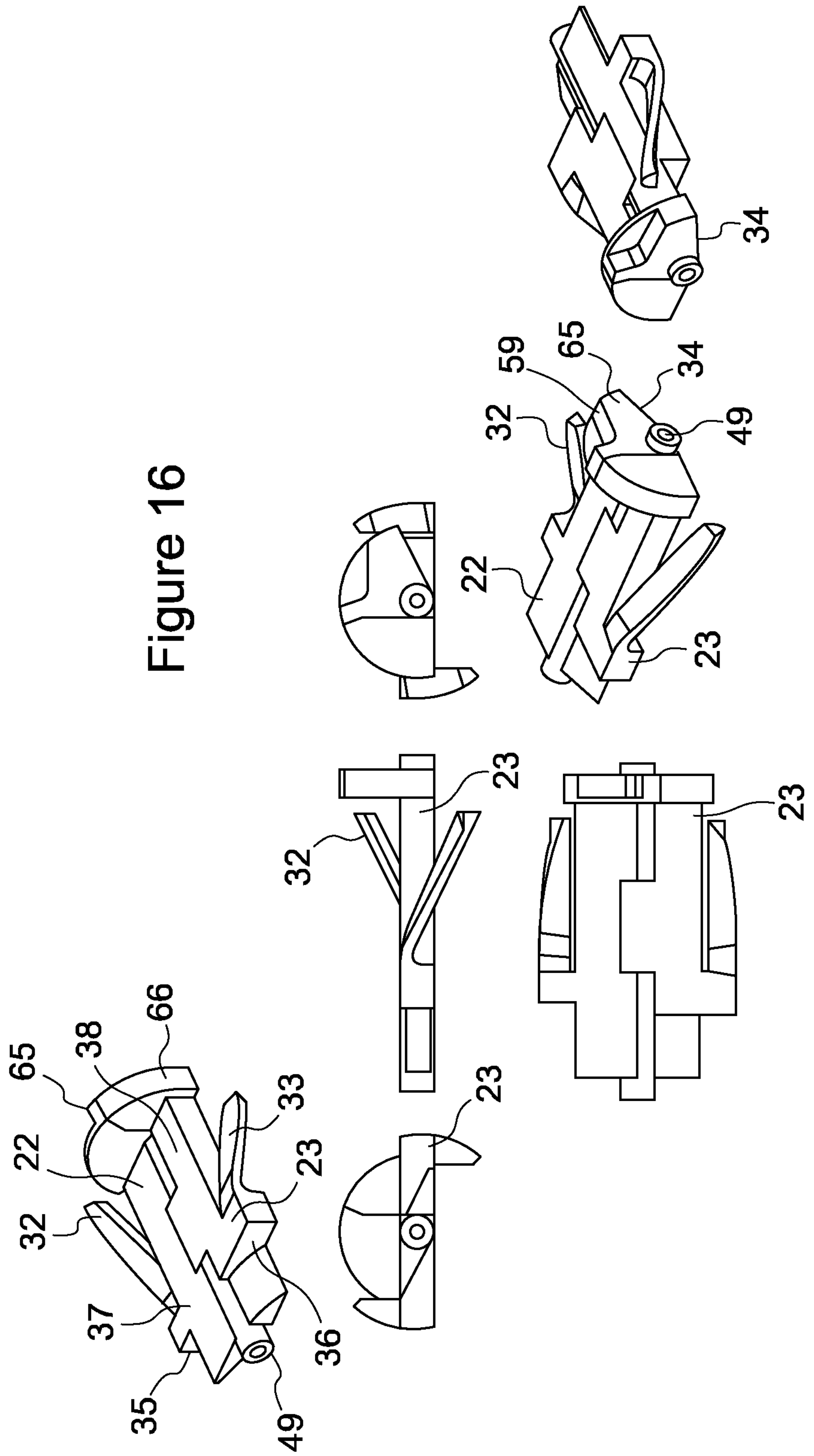
Figure 17:
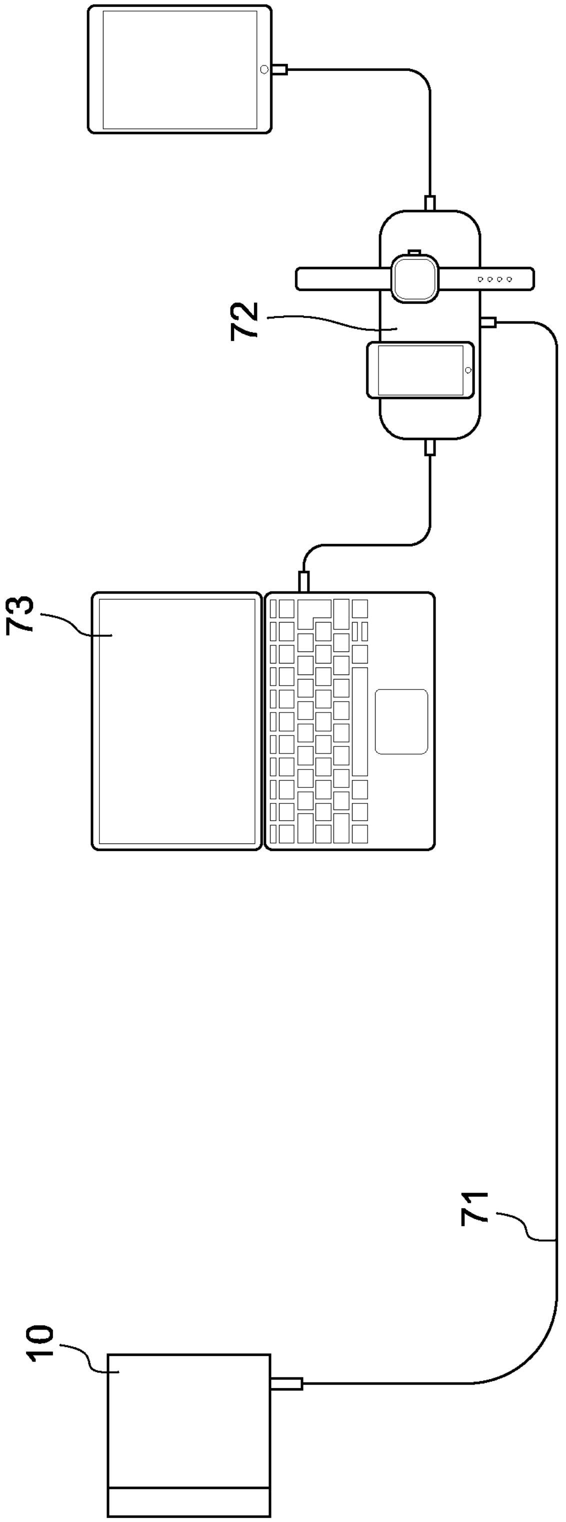
Figure 18:
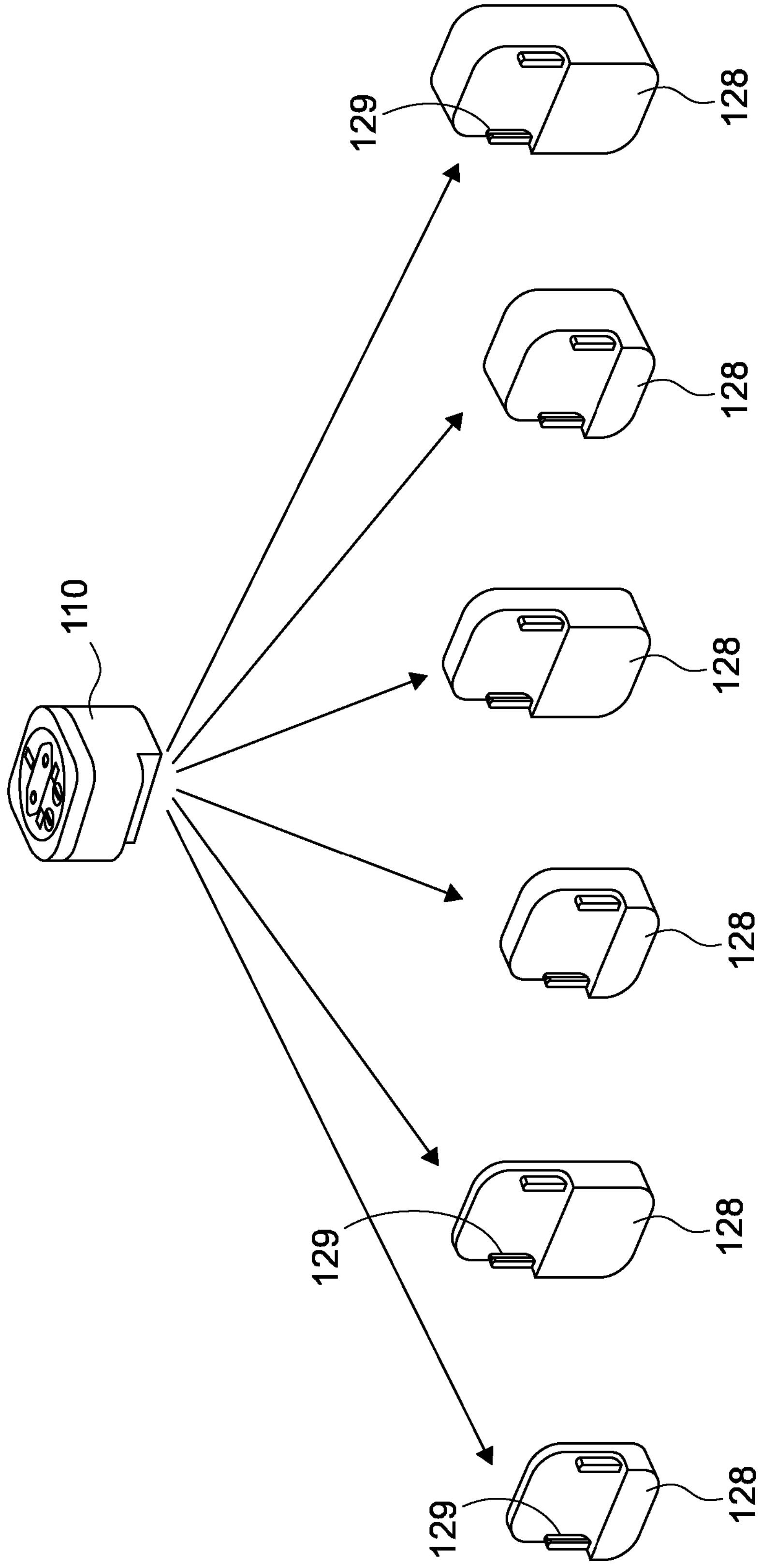
Figure 21:
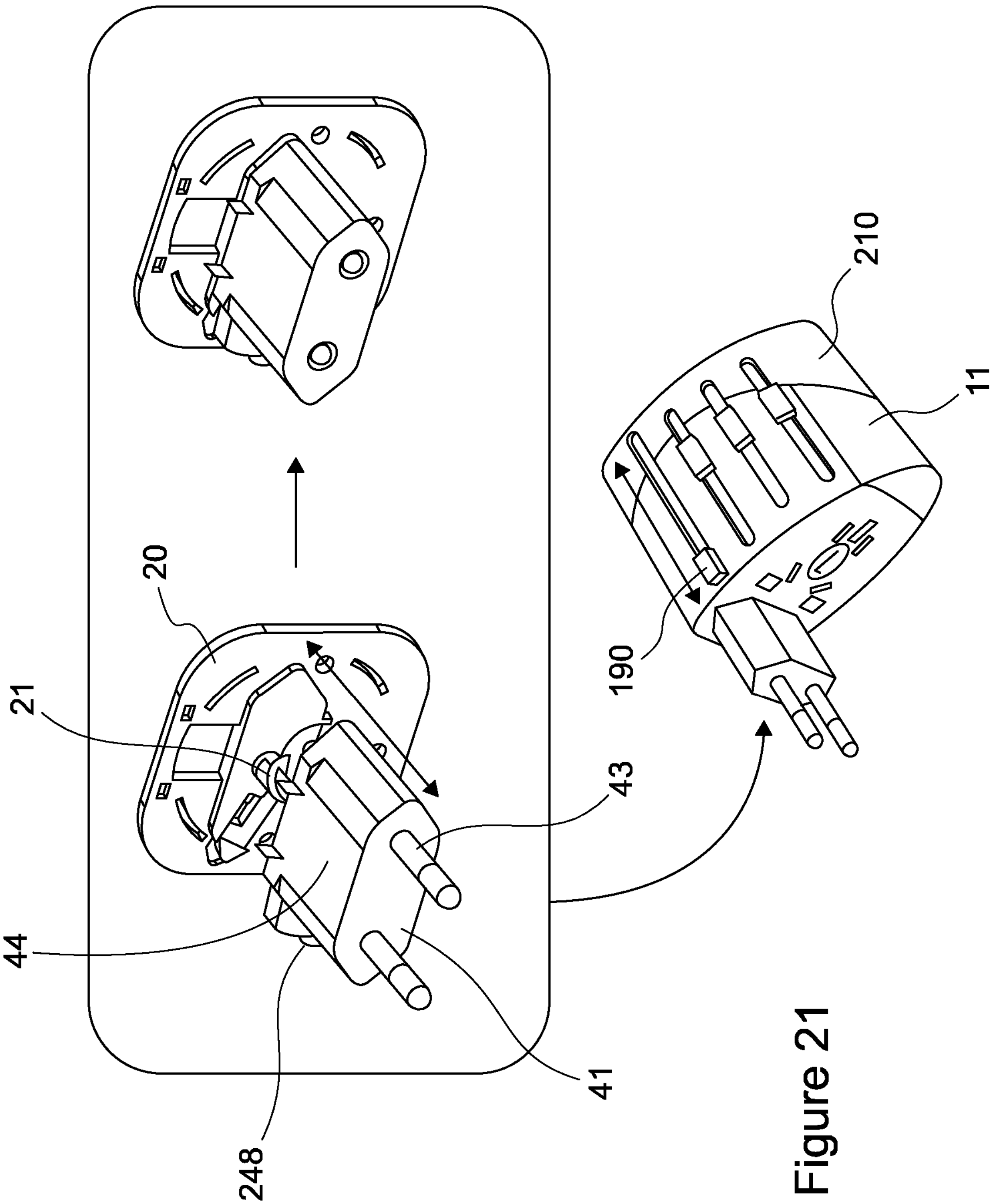
Figure 22A:
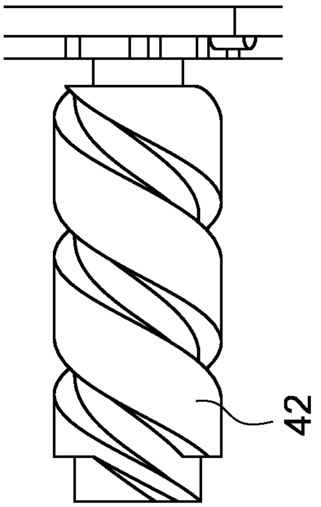
Figure 23:
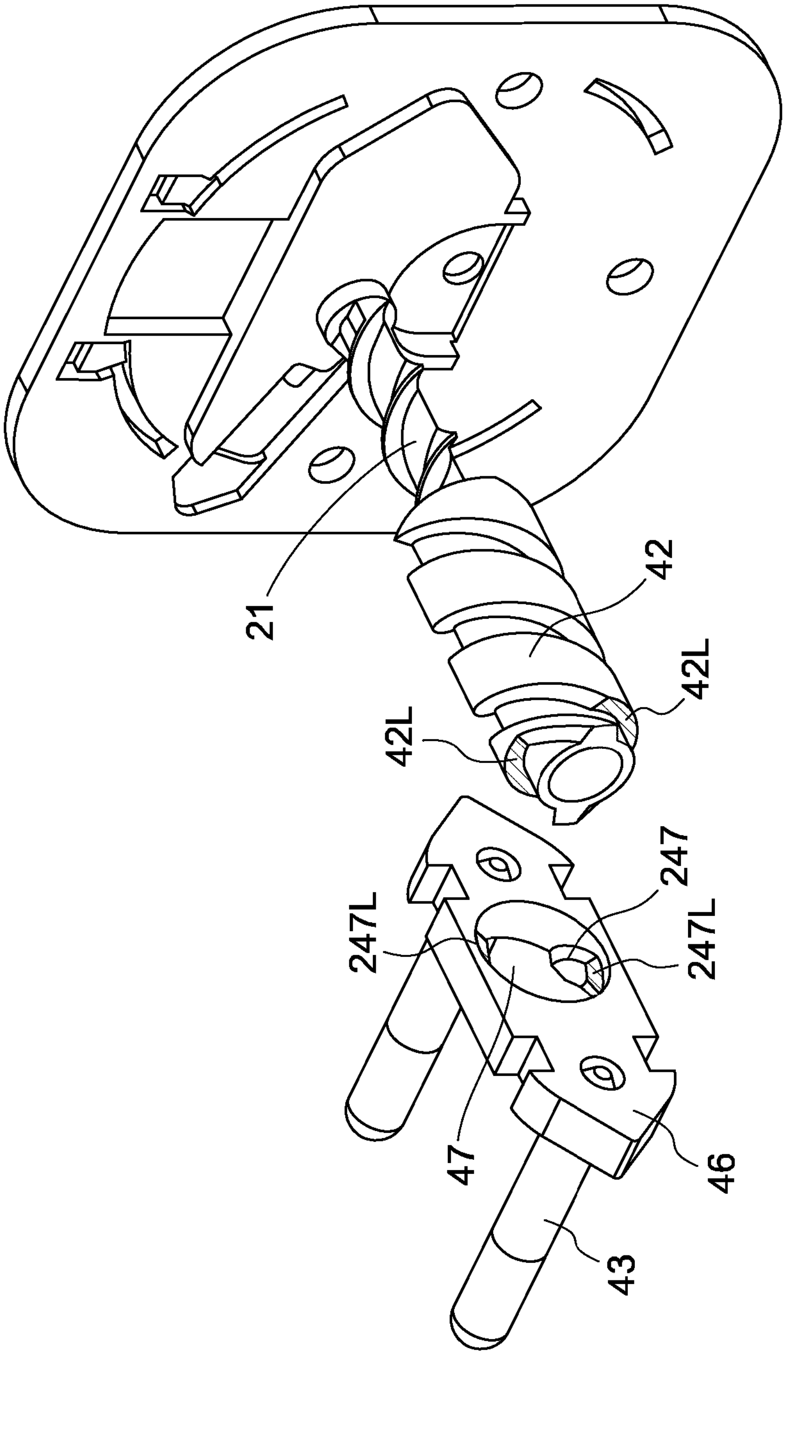
Figure 24:
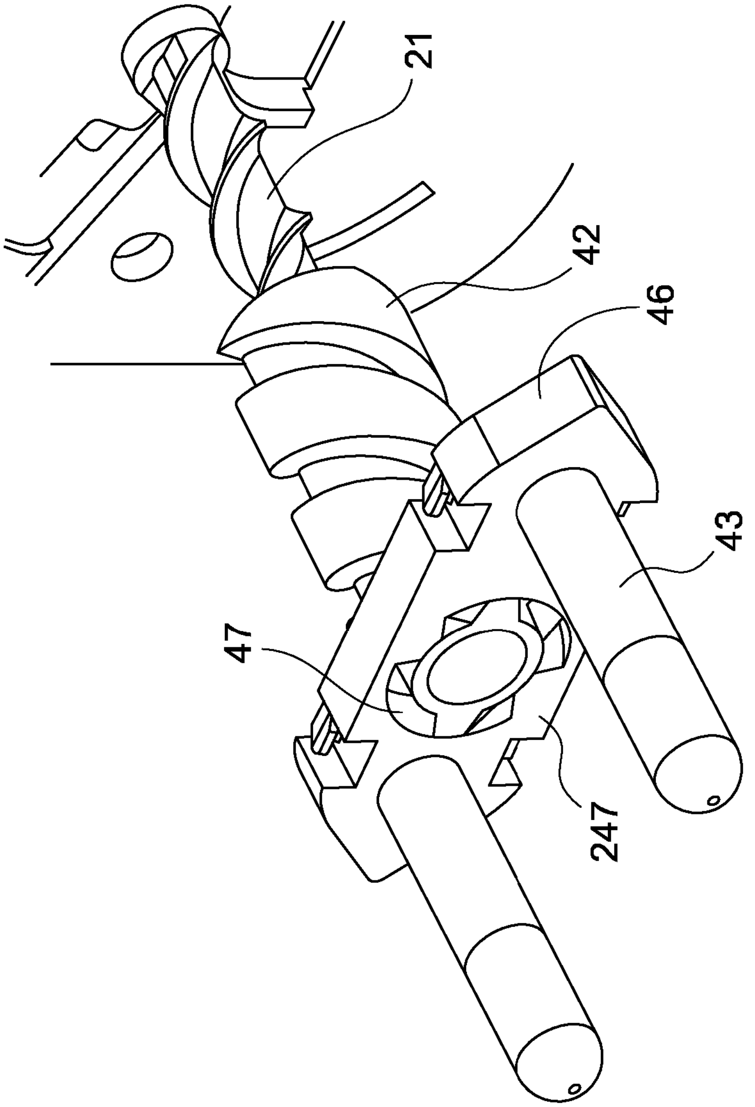
Figure 26A:
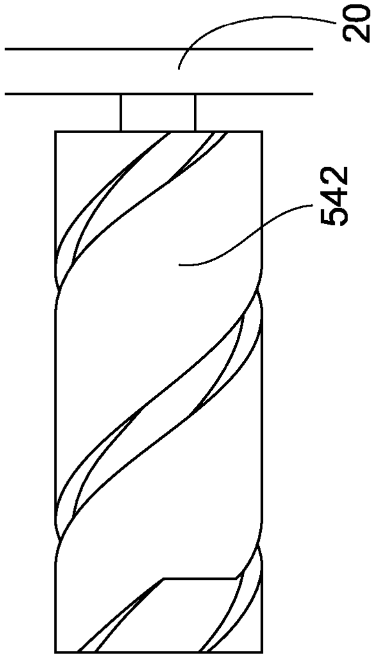
Figure 26B:
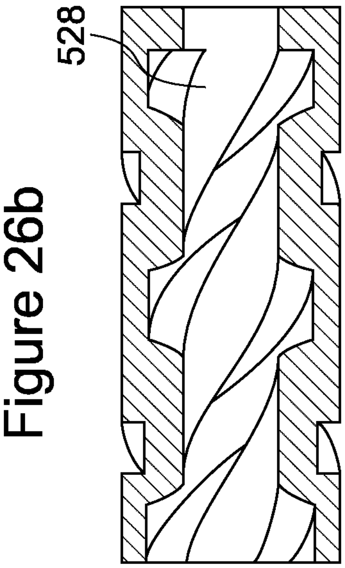
Figure 26C:
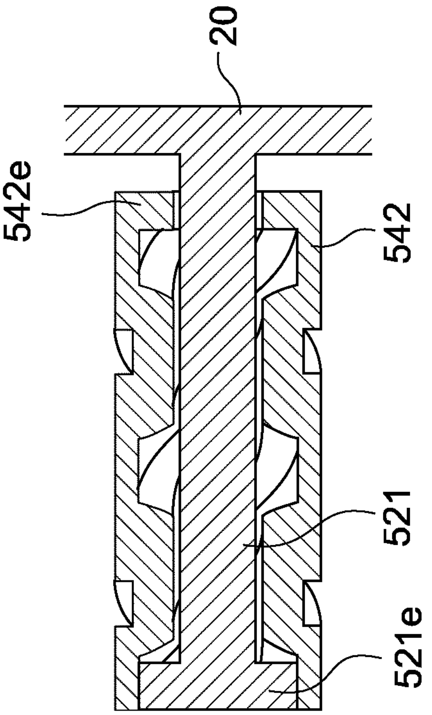
Figure 26D:
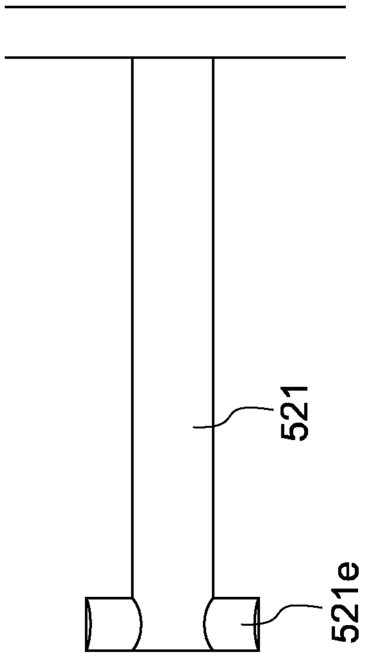

FIGS. 6*d* and *e* is are sectional perspective views of the external worm gear;

FIG. 6*f* is a perspective part-sectional view of the helical shaft and worm gear assembly;

FIGS. 7*a* and 7*b* are perspective and perspective sectional views respectively, of the external worm gear assembly beginning to rotate in an anticlockwise direction to thereby extend the external worm gear;

FIGS. 8*a* and 8*b* are perspective and perspective sectional views respectively, of the external worm gear commencing rotation in a clockwise direction to thereby retract the external worm gear;

FIGS. 9*a*, 9*b* and 9*c* are perspective views of the worm gear assembly, type-C pin assembly, and pin housing respectively, in a fully deployed configuration;

FIGS. 10*a*, 10*b* and 10*c* are perspective views of the worm gear assembly, type-C pin assembly, and pin housing respectively, in a partially retracted intermediate configuration;

FIGS. 11*a*, 11*b* and 11*c* are perspective views of the worm gear assembly, type-C pin assembly, and pin housing respectively, in a fully retracted stowed configuration;

FIG. 12 is an exploded perspective view of the type-G plug assembly;

FIGS. 13*a*-13*l* are sequential side views of the type-G plug assembly showing the plug moving from a stowed to a fully deployed configuration and returning to the stowed configuration;

FIGS. 14*a*-14*c* are end and partial sectional views of the adapter showing a haptic feedback mechanism with a pin assembly in an intermediate configuration;

FIGS. 15*a*-15*c* are end and partial sectional views of the adapter showing a haptic feedback mechanism with the pin assembly in a deployed configuration;

FIG. 16 are perspective, plan, end and side views of holding shutters of a locking mechanism;

FIG. 17 is a schematic view of the adapter of FIG. 1 used in conjunction with a hub to charge several electronic devices;

FIG. 18 are perspective views of another embodiment of a multi-plug adapter arranged to slidably couple with a range of power packs;

FIG. 19 is a perspective view of the multi-plug adapter and modular power pack shown in FIG. 18;

FIG. 20 shows perspective views of the multi-plug adapter and a foldable adapter, both with the same modular power packs;

FIG. 21 shows perspective views of an alternative embodiment of a multi-plug adapter;

FIG. 22*a, c, d* and *b* are side and sectional views of the worm gear assembly;

FIG. 23 is a rear perspective view of the type-C pins and a front perspective view of the extended worm gear showing worm gear locking parts with other adapter parts removed;

FIG. 24 is a front perspective view of the type-C pins and fully extended worm gear with other parts removed;

FIGS. 25*a-e* are side views of the type-C pins and worm gear sequentially extending from the stowed to the locked deployed configurations;

FIGS. 26*a* and *b* are side and sectional views of an embedded dual helix screw worm gear respectively;

FIG. 26*c* is a sectional view of the embedded dual helix worm screw with the internal cylindrical shaft;

FIG. 26*d* is a side view of the internal cylindrical shaft; and

Figure 27C:
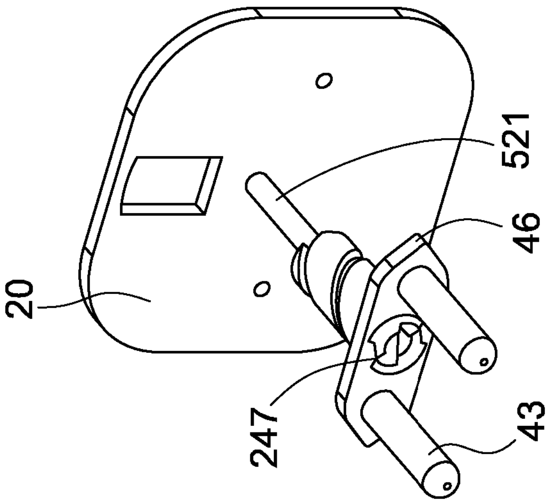
Figure 27B:
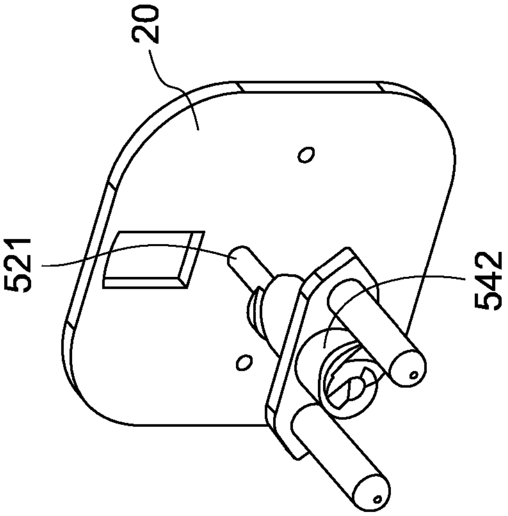
Figure 27A:
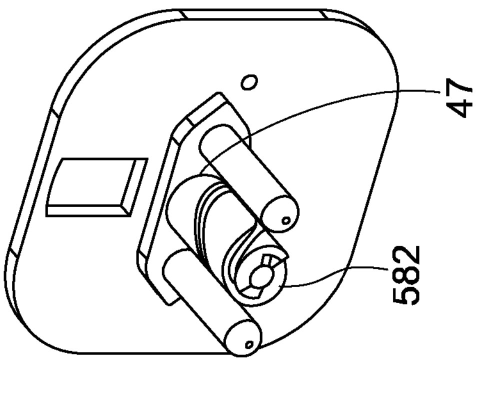

FIGS. 27*a-c* are perspective views of the embedded dual helix screw on a cylindrical shaft showing the type-C pins in the stowed, partially deployed and fully deployed configurations respectively.

A multi-plug adapter or travel adapter is shown generally at 10 in the figures. The travel adapter 10 is arranged to provide a variety of different plugs to engage in complementary power sockets in several different countries and provide a useful electronic output. The travel adapter 10 is thus a single device that functions to provide power for electronic devices in different regions around the world by enabling compatibility with several different types of power socket.

The travel adapter 10 has a multi-part housing comprising an outer housing 11, a rotatable housing 13, a front cover 12 and a rear cover 18 provided to enclose and protect the internal components. Internally, the travel adapter 10 comprises a printed circuit board (PCB) assembly 16, electrically connected to an output 70 and different sets of deployable pins 43, 50, 51, 60. Each of the deployable pins 43, 50, 51, 60, has an associated deployment mechanism.

Figure 2:
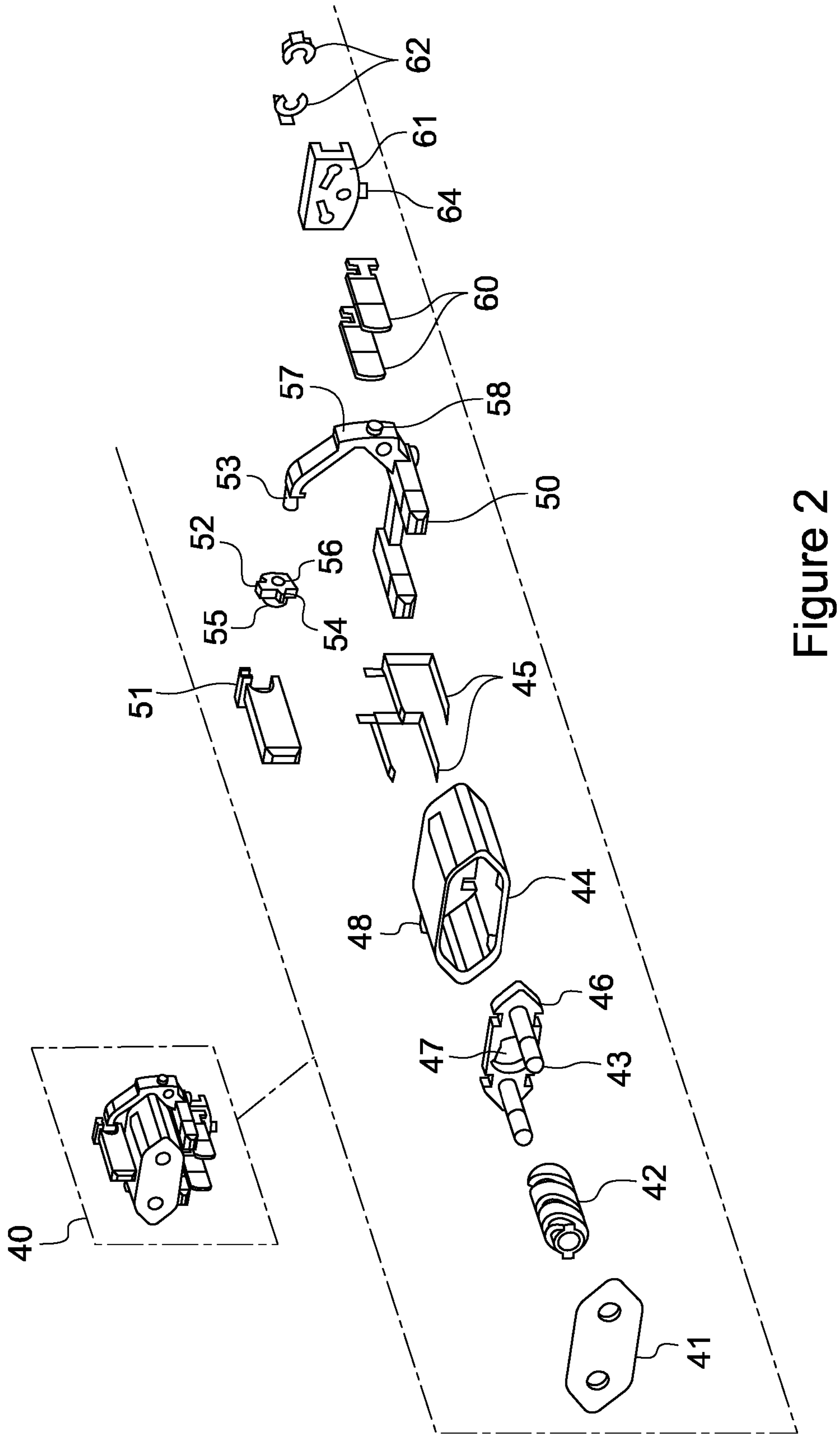
FIG. 2 is an exploded perspective view of the adapter pin assemblies.

Exploded views of the individual components comprising the travel adapter 10 are shown in FIGS. 1 and 2. The PCB assembly 16 is located towards a rear face of the travel adapter 10 within the outer housing 11. The PCB assembly 16 is aligned with a hole on an underside of the outer housing 11 to create the electrical output 70. The PCB assembly 16 includes a backing plate provided with two upper holes 17 to enable other internal components to be securely attached and electrically connected to the PCB assembly 16. A plastic internal cover 20 for the PCB assembly 16 is provided with two upper holes 27 that overlie the upper holes 17 in the PCB assembly 16. The internal cover 20 has several securing slots enabling interconnection of internal components including a central securing shaft 49 for a locking mechanism. The locking mechanism and haptic feedback mechanism include a first and a second holding shutter 22, 23, an actuator key 24 and a key spring 25. The internal cover 20 carries an internal shaft 21 with a helical thread located substantially centrally and extending perpendicular from a front-facing planar face of the internal cover 20.

A compact plug assembly 40 containing different pin assemblies is secured to the internal cover 20. Metal conducting plates 19 extend around the plug set 40 and through the aligned pairs of upper holes 27, 17 to provide the necessary electrical connections between the pins 43, 50, 51, 60 once deployed and the PCB assembly 16. The front cover 12 has a substantially circular face and is fixed over the conducting plates 19 and the plug assembly 40. The front cover 12 has a plurality of holes 15 enabling the deployment of pins 43, 50, 51 60 therethrough. Two circular prong caps 63 are adapted to fit within two of the circular holes 15 in the face of the front cover 12. The circular prong caps 63 are rotatable within their respective holes 15. The rotatable housing 13 has a large circular hole 14 sized to accommodate the front face of the front cover 12. The rotatable housing 13 is coupled to a cam 30 having an inclined and declined cam surface 31. A rear edge of the cam 30 has four recesses 26 spaced at 90 degree intervals that form part of the haptic feedback mechanism. Both the rotatable housing 13 and the cam 30 are rotatable relative to the other components of the travel adapter 10.

FIG. 2 shows the plug set 40 in exploded view. The plug set 40 comprises type-A pins 60 arranged to engage with complementary sockets typically found in North America and China. The type-A pins 60 are located within a type-A pin holder 61 and electrically connected to the PCB assembly 16 by two metal conducting plates 62. The type-A pin holder 61 has a protrusion 64 on its lower edge for interaction with the cam 30 to act as a type-A pin deployment mechanism. The type-A pins 60 and the circular prong caps 63 are rotatable within slots located in the type-A pin holder 61, such that the type-A pins 60 may be angled appropriately for engaging with a complementary type-I socket, such as those typically found in Australasia and China.

The plug set also comprises type-G pins 50, 51 that are received in complementary sockets typically found in the UK. The type-G pins comprise one live pin, one neutral pin 50 and an earth pin 51 as shown in FIGS. 2 and 12. The type-G pins 50 are located on a body 57 that carries a central projecting protrusion 58 and a cylindrical side locator 53 at its upper end. The central projecting protrusion 58 is arranged for selective engagement with the inclined cam surface 31 to move the type-G pins between the stowed and deployed configurations. The cylindrical locator pin 53 is shaped for insertion in a circular hole 56 in the centre of a gear 52. The gear 52 has teeth 54 and a cylindrical side locator 55. The cylindrical side locator 55 is shaped for accommodation in a circular slot at a rear end of the earth pin 51. The cylindrical side locating pins 53, 55 within the respective circular receiving hole 56 and slot to allow the gear 52 to rotate with respect to the body 57 and the pins 50, 51.

Figure 22B:
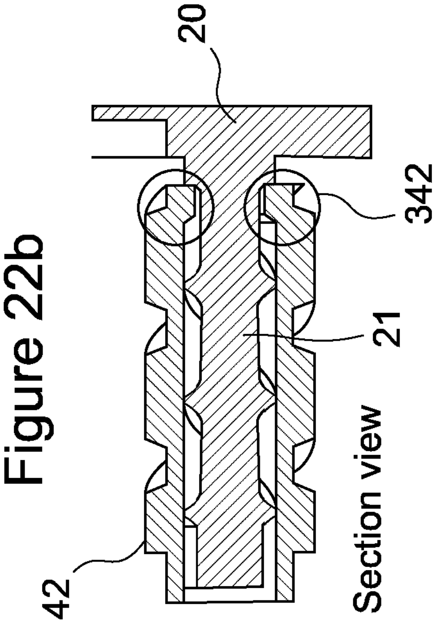

The plug set 40 further comprises type-C pins 43 and a pin support body in the form of a pin housing 44 that is shaped to fit within a complementary recess of a socket and is shown in FIGS. 2 and 5. The type-C pins 43 and pin housing 44 are typically used within complementary sockets in European countries and China. The type-C pins 43 are carried on a pin plate 46 having a centrally positioned hole 47 allowing a pin deployment member in the form of a worm gear 42 to pass therethrough. The centrally positioned hole 47 is provided with shaped protrusions to act as guide threads 247 that extend radially into the hole 47 at two opposing locations (as seen in FIGS. 23 and 24). The guide threads 247 interact with the external threads of the worm gear 42, such that, in use, linear movement of the pin plate 46 occurs simultaneously with rotation of the worm gear 42. A follower 342 in the form of an internal thread located on an internal surface of the worm gear 42 is moveable within the helical thread on the shaft 21 to allow rotation of the worm gear 42 along the shaft 21 (FIG. 22*b*). In the stowed configuration, the pins 43 are located within an internal area defined by the type-C pin housing 44. The pin housing 44 has a front cover 41 with two circular holes, enabling the pins 43 to pass therethrough. Two parallel metal conducting bars 45 are provided for electrical conduction from the pins 43 to the PCB assembly 16. The pin housing 44 has a side protrusion 48, which forms part of the actuation mechanism through interaction with the cam 30 to move the pins 43 between the deployed and the stowed configurations.

Part of the locking mechanism is shown in FIG. 15 in more detail. The locking mechanism comprises a first and a second holding shutter 22, 23 that each have a substantially elongate body 37, 38 respectively and are pivotable around the central securing shaft 49. Each holding shutter 22, 23 comprises a respective wing 32, 33 to act as a torsion spring such that both holding shutters 22, 23 are biased to pivot around the central securing shaft 49 in a clockwise direction. Towards a leading end, each body 37, 38 has a substantially planar locking surface 35, 36 to provide a supported stop behind the respective pin assembly in the deployed and locked configuration. The rear end of each elongate body 37, 38 comprises an arcuate end member 65, 66. An end face of the arcuate end member 65 of the first holding shutter 22 has a lower cutaway portion 34 and an upper key receiving notch 59. The key receiving notch 59 is shaped to receive a tail end 67 of the shutter key 24. Operation of the locking mechanism is described hereinafter.

Components shown in FIGS. 1 and 2 are assembled to form a travel adapter 10 having a compact shape as shown in FIGS. 3*a*, 3*b*, 3*d* and 3*e*. FIGS. 3*c* and 3*f* show the adapter 10 has reduced dimensions when compared with an outline of a conventional prior art adapter depicted by numeral 39. The dimension with the largest reduction is the length of the adapter 10 in the direction of pin 43 deployment and results from the compact design of the type-C pin assembly whereby the pins 43 are stored within the pin housing 44. According to the present embodiment as described above, the type-C pin deployment means embodied by the helical thread 21 and worm gear 42 enables simultaneous tandem deployment of the pin housing 44 and the pins 43. Further reduction in length is achieved by the geared placement of the earth pin 51 on the type-G body 57 so that the leading end of the earth pin 51 lies in the same plane as leading ends of the live and neutral pins 50 in the stowed configuration.

Operation of the travel adapter 10 will now be described with reference to FIGS. 4*a* to 4*h*. When not in use the travel adapter 10 has a compact configuration with all pins 43 retracted as shown in FIG. 4*a*. When a user requires power through use of a socket in a particular region, the user can select the required set of pins 43, 50, 51, 60, which are deployable by rotating the rotatable housing 13 relative to the outer housing 11. A user holds the outer housing 11 and uses their fingers to twist the rotatable housing 13 to actuate the deployment of the required set of pins 43, 50, 51, 60.

Figures 13A, 13B, 13C, 13D, 13E, 13F, 13G, 13H, 13I, 13J, 13K, 13L:
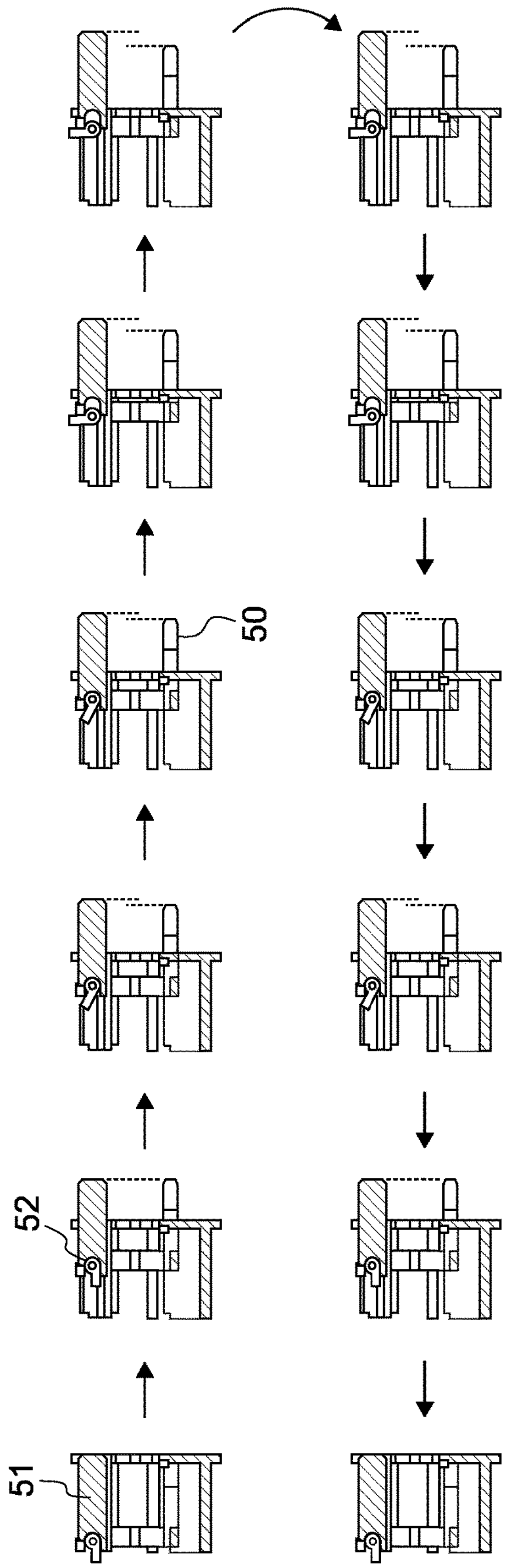

Initially the type-G pins 50, 51 are aligned such that the leading end of each pin 50, 51 lies in the same plane in the stowed configuration as shown in sectional view in FIG. 13*a*. Rotation of the rotatable housing 13 brings the protrusion 58 on the type-G plug body 57 into contact with the inclined cam surface 31 of the cam 30. Continued rotation of the rotatable housing 13, rotates the inclined cam surface 31 to guide outward linear movement of the plug body 57 and the attached pins 50, 51. As shown in FIG. 13*b*, a first tooth 54 of the gear 52 locks into an internal profile within the adapter 10. Continued forward movement of the plug body 57 causes rotation of the gear 52 and further extension of the leading end of the earth pin 51 relative to the live and neutral pins 50 as shown in FIG. 13*c*. Following relative rotation of the rotatable housing 13 and the outer housing 11 by 45 degrees, the type-G pins 50, 51 are partially deployed as shown in FIGS. 4*b* and 13*c*. FIGS. 14*a* to 14*c* show that after 45 degrees of relative rotation, the shutter key 24 has been urged inwardly out of a recess 26 and against the bias of the key spring 25. The tail end 67 of the key 24 acts to push the first shutter 22 against the bias of the torsion spring wing 32 and thus restrict movement or engagement of the locking mechanism. The elongate body 38 of the second shutter 23 is unable to move under the bias of the torsion spring wing 33 because the type-C pin housing 44 is directly above and blocks any rotation around the central securing shaft 49.

Further rotation of the rotatable housing 13 relative to the outer housing 11 continues to guide the protrusion 58 attached to the body 57 along the inclined rotating cam 31 surface and urge linear forward movement of the body 57 and the attached pins 50, 51. A second gear tooth 54 engages an internal profile to cause another rotation of the gear 52 and further linear extension of the earth pin 51 relative to the live and neutral pins 50. Following rotation of the rotatable housing 13 relative to the outer housing 11 through 90 degrees from the starting position, the protrusion 58 is at the apex of the cam surface 31 and the type-G pins are fully deployed as shown in FIGS. 4*c* and 13*f*. In this position, FIGS. 15*a* to 15*c*, show that the shutter key 24 is urged into the recess 26 under the bias of the spring 25 to provide haptic feedback to a user and confirmation that the type-G pins are fully deployed. In this position, the tail end 67 of the shutter key 24 releases the locking mechanism. The first shutter 22 is free to pivot under the bias of the torsion spring wing 32. Thus, the first shutter 22 pivots around the central securing shaft 49 into the position recently occupied by the now deployed type-G pin 50, 51 assembly. This pivoting of the first shutter 22 moves the first locking surface 35 beneath the type-G pin 50, 51 assembly to provide an impediment to prevent inadvertent retraction of the pins 50, 51 as the type-G pins 50, 51 are plugged into a complementary socket. In the fully deployed configuration, the earth pin 51 has a greater linear extension relative to the live and neutral pins 50 as required for complementary mating with type-G plug sockets. The travel adapter 10 is now ready to be plugged into a type-G socket by the user to provide electrical power via the output 70.

Clockwise rotation of the rotatable housing 13 relative to the outer housing 11 moves the rotatable cam 30 and the recess 26 on the base of the cam 30. Movement of the recess 26 forces the shutter key 24 inwardly against the bias of the key spring 25. In this position, the tail end 67 of the shutter key 24 enters the key receiving notch 59 to pivot the first shutter 22 in an anticlockwise direction to unlock the mechanism and allow space for the type-G pin 50, 51 assembly to retract. Simultaneously, the base of the inclined cam surface 31 is brought into contact with the protrusion 64 attached to the type-A pin holder 61. Further rotation of the cam 30 guides movement of the protrusion 64 up the inclined cam surface 31 to move the pin holder 61 outwardly such that the type-A pins 60 move in a linear outward direction. At the same time, the protrusion 58 on the type-G pin body 57 is guided along the declined cam surface 31 to cause linear rearward movement of the body 57 to thereby retract the type-G pins 50, 51 as shown in FIG. 13*g*-13*j*. The earth pin 51 is retracted in a reverse process to that previously described with reference to FIG. 13*a*-13*f*. FIG. 4*d* shows the rotation of the rotatable housing 13 through 135 degrees relative to the starting position with the type-A pins 60 partially deployed and the type-G pins 50, 51 returning to the stowed configuration.

Relative rotation of the rotatable housing 13 and the outer housing 11 through 180 degrees results in full extension and deployment of the type-A pins 60 and retraction of the type-G pins 50, 51 into the stowed configuration as shown in FIGS. 4*e*, 13*k* and 13*l*. In this positon, the protrusion 64 rests on the apex of the cam surface 31. As previously described, the haptic mechanism provides feedback for the user as the shutter key 24 pops into one of the recesses 26 in the fully deployed configuration of the type-A pins 60. As seen in the rear view of FIG. 14*c*, the type-A pins 60 are in close proximity to the protrusion 64. As a result, pressure on the type-A pins 60 in the deployed configuration is translated to the protrusion 64 that is held at the apex of the cam surface 31. Tolerances between the internal components are small within the travel adapter 10 and therefore the protrusion 64 acts as a lock to inhibit rearward movement of the type-A pins 60 once deployed. No bending moments are generated since the type-A pins 60 are in close proximity to the protrusion 64 and no separate additional locking mechanism is required. In this fully deployed configuration, a user may plug the pins 60 of the travel adapter 10 into a complementary socket to provide power via the output 70.

The type-A pins 60 are rotatable in opposing directions as shown in FIG. 4*e*. A user holds the pins 60 and twists to rotate the pins 60 and prong caps 63 within the front cover 12 to form a type-I pin configuration. In the type-I configuration the pins 60 of the travel adapter 10 are mateable with a complementary type-I socket.

Clockwise rotation of the rotatable housing 13 relative to the outer housing 11 brings the protrusion 48 on the pin housing 44 into contact with the leading end of the inclined cam surface 31. Further rotation causes the protrusion 48 to follow the inclined cam surface 31 resulting in linear outward movement of the pin housing 44. Since the external worm gear 42 is carried within the pin housing 44, the worm gear 42 also moves with the housing 44 relative to the internal cover 20. The worm gear 42 rotates along the internal helical shaft 21 because the follower 342 on the internal surface of the worm gear 42 is located in the helical thread on the shaft 21. Thus, linear movement of the pin housing 44 results in linear as well as rotational movement of the worm gear 42. The pins 43 carried on the pin plate 46, which are housed within the pin housing 44 and coupled to the external worm gear 42, are urged outwardly in a linear direction as the worm gear 42 rotates. The guide threads 247 in the pin plate 46 interact with the external thread on the rotating worm gear 42, which results in the linear outward movement of the pin plate 46 and attached pins 43. Thus, the pins 43 move out with the pin housing 44 to project through the pin holes in the front cover 41 of the pin housing 44 as shown in FIG. 4*f*, with reference to FIGS. 5, 6, 8, and 25*b*-*c*. Rotation of the rotatable housing 13 relative to the outer housing 11 through 225 degrees from the initial position results in partial deployment of the type-C pins 43 and the pin housing 44 and partial retraction of the type-A pins 60. Retraction of the type-A pins 60 occurs because the protrusion 64 on the base of the type-A pin housing 61 is guided along the trailing face of the declined cam surface 31.

Figure 22C:
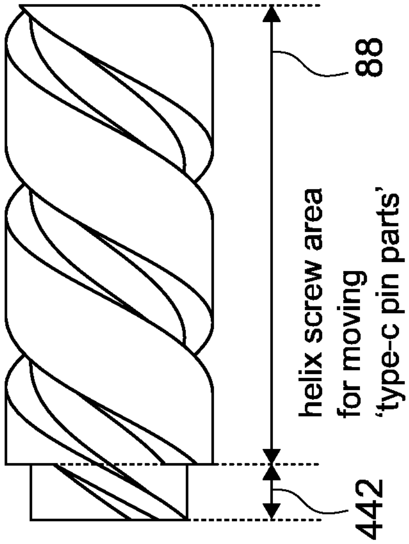
Figure 22D:
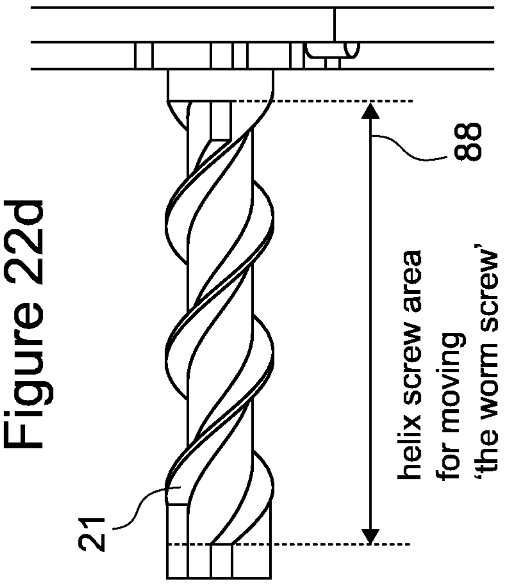
Figures 25A, 25B, 25C, 25D, 25E:
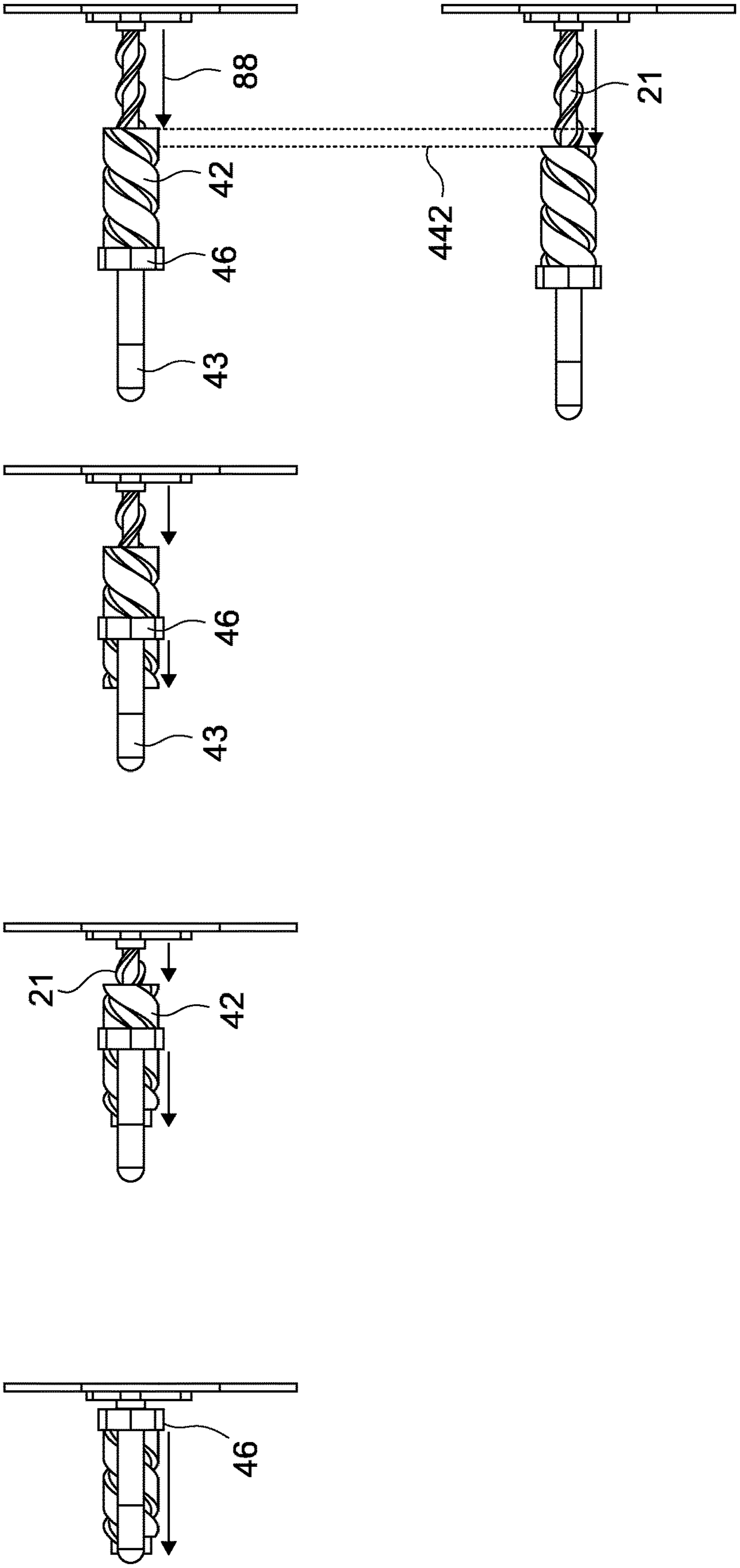

Continued rotation urges the protrusion 48 on the pin housing 44 up the inclined cam surface 31 to cause further linear movement of the pin housing 44. This outward movement of the pin housing 44 is translated to the pins 43 via the worm gear assembly 21, 42, which simultaneously pushes the pins 43 through the front cover 41 until they are fully deployed as shown in FIG. 25*d*. This overall linear extension corresponds with a helix screw length 88 for moving the type-C pins 43, 46 into the fully deployed configuration (FIGS. 22*c, d* and 25*d*). In this position, the type-C pins are fully deployed relative to the pin housing 44, but the pin housing 44 is not yet fully deployed relative to the body of the adapter 10. A small amount of additional rotation of the rotatable housing 13 causes the protrusion 48 to reach the peak of the inclined surface of the cam, resulting in a corresponding small further linear movement of the pin housing 44 and rotation of the worm gear 42 therein until the pin housing 44 is fully deployed in the operational configuration as shown in FIG. 25*e*. This occurs when the rotatable housing 13 has rotated relative to the outer housing 11 by 270 degrees from the starting position. In this position, both the type-C pins 43 and the pin housing 44 are in the fully deployed configurations.

Deployment of the pin housing 44 creates an internal void within the outer housing 11 and provides a space into which the elongate body 38 of the second shutter 23 is pivotable. This is enabled since the shutter key 24 is biased into the recess 26 and therefore the tail end 67 of the shutter key 24 is removed from the notch 59 to allow movement of the first shutter 22. The first shutter 22 pivots around the central securing shaft 49 such that the cutaway portion 34 abuts the type-G pin assembly therebelow. Thus, both shutters 22, 23 have the space required to pivot around the central securing shaft 49 such that the second locking surface 36 moves beneath the type-C pin housing 44 to resist rearward movement thereof. In addition, the type-C pins 43 are locked in the deployed configuration by means of a locking area 442 of the worm gear assembly 21, 42 (FIGS. 22*c*,*d*, 23 and 25*e*). The type-C pins 43 are fully deployed when the worm gear 42 has traversed along the full length 88 of the helix screw area. Further incremental linear movement of the pin housing 44 (between FIGS. 25*d* and *e* in the type-C pin locking area 442) causes a small rotation of the worm gear 42 within the pin housing 44. This extra rotation of the worm gear 42 causes a worm gear locking surface 42L at the leading end of the worm gear 42 to abut a guide thread 247 locking surface 247L (FIG. 25*e*). This abutment of the worm gear locking surface 42L and guide thread locking surface 247L substantially restricts rotation of the external worm gear 42 and rearward movement of the type-C pins 43 on the application of an external force thereto. At this point the type-A pins 60 are fully retracted and retained within the adapter 10 housing 11 in the stowed configuration. The type-C pins 43 and pin housing 44 of the travel adapter 10 are fully deployed and locked and therefore can be safely inserted in a complementary European socket to provide power via the output 70.

The type-C pins 43 can be retracted in order to store the adapter 10 in the most compact configuration with all pins 43, 50, 51, 60 stowed within the outer housing 11 when not in use. This is achieved by further rotation of the rotatable housing 13 to cause movement of the recess 26 so that the shutter key 24 pops out of the recess 26 and is urged against the bias of the spring 25. The tail end 67 of the shutter key 24 pushes against the first shutter 22 to pivot both shutters 22, 23 in an anticlockwise direction around the central securing shaft 49 and unlock the locking mechanism to remove the impediment to retraction of the type-C pin 43 assembly. The protrusion 48 on the pin housing 44 follows the declined trailing cam surface 31 to cause linear rearward movement of the pin housing 44. The initial rearward movement of the pin housing 44 causes an initial rotation of the worm gear 42 in an opposing direction within the locking area 442 to space the worm gear locking surface 42L and the guide thread locking surface 247L. This unlocks the type-C pins 43 and pin plate 46, which are now able to commence linear rearward movement in tandem with the pin housing 44. Movement of the type-C pin 43 assembly into the stowed configuration continues in a reverse process of that described in connection with the type-C 43 pin deployment.

FIGS. 9*a* to 9*c* show the worm gear assembly 21, 42, the pins 43 and the pin housing 44 all in an extended deployed configuration. Rotation of the rotatable housing 13 by 315 degrees from the starting position results in retraction of the pin housing 44 and the pins 43 via the worm gear assembly 21, 42. The components of the adapter 10 are in partially retracted positions as shown in FIGS. 4*h*, 10*a*, 10*b* and 10*c*. Continued rotation of the rotatable cover 13 through 360 degrees from the starting position causes full retraction of the external worm gear 42, the type-C pins 43 within the pin housing 44, and the pin housing 44 itself, such that the adapter returns 10 to the compact configuration with all pins 43, 50, 51, 60 stowed within the housing as shown in FIG. 4*a*.

Each deployment of selected pins 50, 51, 60, 43 occurs after rotation of the rotatable cover 13 in the appropriate position through 90 degree intervals. Therefore there is a clear visual indicator of each pin deployment 50, 51, 60, 43 position, when the rotatable cover 13 is aligned with the outer housing 11 such that the adapter 10 forms a substantially cuboid shape with rounded edges. This provides visual feedback for a user to confirm that plug assemblies are in the fully deployed and/or stowed configurations.

As shown in FIG. 14, the travel adapter 10 is insertable into a socket matching any of the pin types, -A, -C, -G and -I, and the USB-C output 70 connected via wires 71 to a hub 72. The hub 72 may include a wireless charger for charging devices such as phones and watches. The hub 72 may also have output slots enabling wires to connect the hub 72 to other electronic devices 73, such as laptop computers and tablets to supply electric power and charge these devices.

One key benefit of all embodiments of the present invention is that the overall dimensions of the adapter 10 are reduced compared with conventional alternatives. In particular, the length of the power adapter 10 in the direction of pin deployment is significantly reduced in the stowed configuration when compared with conventional alternatives as shown in FIG. 3*c*. Features enabling this reduction in size are the stowing of the pins 43 within the volume defined by the pin housing 44 of the type-C pin assembly, the type-C pin deployment means enabling simultaneous tandem deployment of the pin housing 44 and the type-C pins 43 and the gear 52 mechanism to allow more compact storage of the earth pin 51 of the type-G pin assembly.

The locking mechanism is advantageous to prevent inadvertent retraction or damage to the pins 43, 50, 51, 60 on application of a force thereto. The bending moment applied to type-C and type-G pins 43, 50, 51 is greater since the protrusions 48, 53 holding the respective pins 43, 50, 51 in the deployed configurations are further away from the pins 43, 50, 51. Thus, without the locking mechanism the pins 43, 50, 51 would be subject to a bending moment with potential for pin damage. Furthermore, the locking mechanism functions automatically on deployment of the pins 43, 50, 51 so that no additional input is required by a user to ensure the pins 43, 50, 51 are safely deployed and locked in this configuration.

FIGS. 26*a-d* and 27*a-c* show an alternative embodiment of the type-C actuation means for movement of the type-C pins between the stowed and deployed configurations. In order to minimise repetition, similar features of the apparatus described subsequently are numbered with a common two-digit reference numeral and are differentiated by a third digit placed before the two common digits. Such features are structured similarly, operate similarly, and/or have similar functions as previously described unless otherwise indicated. As shown in FIG. 26*b*, the pin deployment member takes the form of a worm gear 542 with embedded dual helix screw 582. The internal cover 20 carries a cylindrical shaft 521 extending perpendicular to the front facing planar face of the internal cover 20. The helical screw 582 is embedded within the worm gear 542 so that the smooth internal surface of the worm gear 542 is movable along the cylindrical shaft 521. The cylindrical shaft 521 has a T-shaped end stop 521*e* that is arranged to abut an internal surface of a worm gear end stop 542*e* when the type-C pins 43 are in the fully deployed configuration. The end stops 521*e*, 542*e* ensure that the worm gear 542 with embedded dual helix screw 582 remains coupled to the internal shaft 521 throughout actuation of the adapter 10.

With reference to FIGS. 27*a-c*, the type-C pins 43 attached to the pin plate 46 and the pin housing 44 are moved, deployed and stowed in the same manner described with reference to the previous embodiment. The worm gear 542 is carried within the pin housing 44, and rotates along with linear movement of the pin housing 44 while sliding along the internal cylindrical shaft 521. The type-C pins 43 carried on the pin plate 46, which are housed within the pin housing 44 and coupled to the external worm gear 542, are urged in a linear direction as the external worm gear 542 translates along the cylindrical shaft 21 within the pin housing 44. The locking mechanisms and haptic feedback mechanisms all operate in the manner previously described.

According to alternative embodiments of the invention, different outputs 70 are provided. The USB type-C (USBC) output 70 provides one example of a power output. However, the adapter 10 may be modified to provide alternative sockets or power outputs for usefully engaging with devices requiring a power source.

With reference to FIGS. 18 to 21, further embodiments of the present invention will now be described. The travel adapter 110 of FIGS. 18 to 20 is similar in structure and is provided with the plug set 40, actuation and locking mechanisms. However, the travel adapter 110 has an alternative output 170 in the form of two metal conducting pins located within an interconnecting means in the form of a slot. There is no PCB assembly 16 within the travel adapter 110, but instead, the conducting pins output 170 maintains an electric conduction path to the pins 43, 50, 51, 60 when the pin assemblies are in the deployed configuration. Several power packs 128 of different sizes and power outputs are provided for connecting with the travel adapter 110. An electric connection is made between the travel adapter 110 and the power packs 128 via an interconnecting interface in the form of keys 129 arranged to slide and lock within the slot at the rear of the travel adapter 110. This allows the travel adapter 110 to be used as part of a modular system interchangeably with other adapters, such as a foldable adapter 180, and with power packs 128 of different sizes and ratings to provide power to devices having differing power requirements.

Another embodiment of the invention is shown in FIG. 21. The multi-plug adapter 210 is a conventional design having actuators in the form of levers 190 slidable within slots in the housing 11. The levers 190 are directly coupled to each respective pin assembly such that linear movement of each lever 190 causes linear movement of the coupled pin assembly. However, the design is modified by the incorporation of the type-C pin assembly of the invention including the pins 43 stowed within the housing 44 and connected to the internal helical shaft 21 on the rear cover 20 via a worm gear 42, which are operable as previously described. The pin housing 44 is provided with a side protrusion 248 for engaging with the lever 190 such that actuation and deployment of the type-C pins can be controlled by a user.

Although particular embodiments of the invention have been disclosed herein in detail, this is by way of example and for the purposes of illustration only. The aforementioned embodiments are not intended to be limiting with respect to the scope of the statements of invention and/or the appended claims. Relative terms such as "front", "clockwise", "anti-clockwise", "rear", "end", "upper", "lower" and "rear" are illustrative and are not intended to be limiting.

It is contemplated by the inventors that various substitutions, alterations, and modifications may be made to the invention without departing from the scope of the invention as defined by the statements of invention and/or claims.

The invention claimed is:

1. A multi-plug adapter comprising:

a type-C pin assembly comprising pins and a pin support body;

at least one additional pin assembly comprising a different pin arrangement;

a housing for housing the pin assemblies, wherein the housing comprises a plurality of holes in a first face allowing deployment of the selected pins therethrough;

an actuation mechanism cooperable with each pin assembly, wherein the actuation mechanism is adapted to selectively move each pin assembly between a stowed configuration in which the pins are stowed within the housing and a deployed configuration in which the pins protrude through the respective holes in the first face of the housing and are engageable in a complementary socket, the actuation mechanism further comprising a type-C pin deployment means that comprises a pin deployment member rotatably coupled to the type-C pins within the pin support body such that rotation of the pin deployment member causes linear movement of the type-C pins, wherein the type-C pin deployment means comprises a worm gear assembly coupled to the type-C pins and the pin support body;

an electrical output, wherein the electrical output is electrically connected to each pin assembly in the deployed configuration; and wherein the type-C pins are at least partially located within the pin support body in the stowed configuration and wherein the type-C pins and pin support body are simultaneously movable between the stowed and deployed configurations.

2. The multi-plug adapter as claimed in claim 1, wherein the type-C pins are located within an internal volume defined by the pin support body in the stowed configuration.

3. The multi-plug adapter as claimed in claim 1, wherein the pin support body has holes within a leading face and the type-C pins are movable between the stowed and deployed configurations within the holes.

4. The multi-plug adapter as claimed in claim 1, wherein the actuation mechanism comprises a cam cooperable with each pin assembly and arranged such that movement of the cam causes selective movement of the cooperable pin assembly.

5. The multi-plug adapter as claimed in claim 4, wherein the cam and the pin assemblies are arranged and located such that the cam is cooperable with each pin assembly within a different 90 degree arc.

6. The multi-plug adapter as claimed in claim 4, wherein the actuation mechanism comprises an actuator to initiate actuation and movement between the stowed and the deployed configurations and wherein the actuator comprises a rotatable member coupled to the cam.

7. The multi-plug adapter as claimed in claim 6, wherein the actuator comprises a portion of rotatable housing, wherein the rotatable housing and attached cam are engageable with a protrusion of a respective pin assembly at 90 degree intervals.

8. The multi-plug adapter as claimed in claim 1, wherein the actuation mechanism comprises a cam having an angled cam surface and a protrusion coupled to each pin assembly such that each protrusion is arranged to cooperate with the angled cam surface in a particular orientation to cause selective movement of each pin assembly between the stowed and the deployed configurations.

9. The multi-plug adapter as claimed in claim 8, wherein the angled cam surface has an inclined surface to guide each protrusion and coupled pin assembly from the stowed to the deployed configuration, and a declined surface to guide each protrusion and coupled pin assembly from the deployed to the stowed configuration.

10. The multi-plug adapter as claimed in claim 1, wherein the actuation mechanism comprises an actuator coupled to a portion of each pin assembly, wherein the actuator is slidable within a slot located in the housing of the multi-plug adapter to move each pin assembly between the stowed and deployed configurations.

11. The multi-plug adapter as claimed in claim 10, wherein the actuator is a slidable lever that is directly coupled to a respective pin assembly, such that linear movement of the slidable lever causes corresponding linear movement of the coupled pin assembly.

12. The multi-plug adapter as claimed in claim 1, wherein the pin deployment member is coupled to a helical shaft fixed within the adapter housing such that linear movement of the pin support body causes rotation of the pin deployment member.

13. The multi-plug adapter as claimed in claim 1, wherein the type-C pin deployment means is arranged such that actuation of the actuation mechanism to deploy the type-C pins causes linear outward movement of the pin support body, and rotation of the pin deployment member, within the pin support body, coupled to the type-C pins to thereby cause simultaneous linear outward movement of the type-C pins and the pin support body.

14. The multi-plug adapter as claimed in claim 1, wherein the worm gear assembly comprises a shaft with a helical thread fixed within the adapter housing and an external worm gear located within the pin support body.

15. The multi-plug adapter as claimed in claim 1, wherein the actuation mechanism comprises a type-C pin deployment means including a double helix screw member located within the pin support body and rotatably coupled to the type-C pins such that the pin support body and type-C pins are simultaneously deployable.

16. The multi-plug assembly as claimed in claim 15, wherein the type-C pin deployment means comprises a cylindrical shaft fixed within the adapter housing and a double helix screw embedded in a worm gear that is arranged to move along the cylindrical shaft.

17. The multi-plug assembly as claimed in claim 1, wherein the type-C deployment means comprise a type-C pin locking portion arranged to substantially restrict retraction of the type-C pins and/or the pin support body on application of an external force in use.

18. The multi-plug adapter as claimed in claim 17, wherein the type-C locking portion comprises at least one stop member to substantially restrict rotation of the type-C deployment means and retraction of the type-C pins and/or the support body on application of an external force.

19. The multi-plug adapter as claimed in claim 1, wherein, the multi-plug adapter further comprises a locking mechanism arranged to lock at least one of the pin assemblies in the deployed configuration.

20. The multi-plug adapter as claimed in claim 19, wherein the, locking mechanism is biased to lock at least one of the pin assemblies in the deployed configuration and arranged such that movement of at least one of the pin assemblies into the deployed configuration automatically causes actuation of the locking mechanism.

21. The multi-plug adapter as claimed in claim 19, wherein the locking mechanism comprises:

two locking shutters to each lock a respective pin assembly in the deployed configuration;

an actuator key to allow selective engagement of the locking mechanism; and wherein the actuator key is cooperable with the shutters to selectively allow movement of the shutters.

22. The multi-plug adapter as claimed in claim 21, wherein the shutters are biased towards the locking position on deployment of the respective pin assemblies and removal of the actuator key enables the respective shutter to lock behind the pin assembly.

23. The multi-plug adapter as claimed in claim 1, wherein the multi-plug adapter comprises a visual indictor to enable a user to identify when each of the pin assemblies is in the fully deployed configuration.

24. The multi-plug adapter as claimed in claim 23, wherein the visual indicator comprises a portion of the actuator that is shaped to at least partially match a shape of the housing such that alignment of the shaped actuator and the housing signifies the pin assemblies are in the fully deployed configuration.

25. The multi-plug adapter as claimed in claim 23, wherein the visual indicator comprises visual markers wherein alignment of the visual markers indicate that the adapter is in the fully deployed and/or the stowed configurations.

26. The multi-plug adapter as claimed in claim 1, wherein the multi-plug adapter comprises a haptic indictor to enable a user to identify when each of the pin assemblies is in the fully deployed configuration.

27. The multi-plug adapter as claimed in claim 26, wherein the haptic indicator comprises a haptic feedback mechanism coupled to the actuation mechanism and arranged to provide a sensory signal once a pin assembly is in the stowed and/or the fully deployed configuration.

28. The multi-plug adapter as claimed in claim 27, wherein the haptic feedback mechanism comprises at least one recess associated with each fully deployed and/or stowed configuration and a key biased towards the or each recess, wherein engagement of the key with the recess provides haptic feedback and confirmation of the fully deployed and/or stowed configurations.

29. The multi-plug adapter as claimed in claim 1, wherein the multi-plug adapter comprises at least three different pin assemblies.

30. The multi-plug adapter as claimed in claim 1, wherein the multi-plug adapter further comprises a type-I pin assembly.

31. The multi-plug adapter as claimed in claim 1, wherein the housing is substantially cuboid in shape with rounded edges.

32. The multi-plug adapter as claimed in claim 1, wherein the multi-plug adapter has a length less than 35 mm when the pin assemblies are in the stowed configuration.

33. The multi-plug adapter as claimed in claim 1, wherein the electrical output may comprise at least one output selected from the group including: an electric connector, USB, USB-C and any socket type.

34. The multi-plug adapter as claimed in claim 1, wherein the multi-plug adapter forms part of a modular system and is interconnectable with modular power packs of different sizes.

35. A multi-plug adapter comprising:

at least two different pin assemblies, each pin assembly adapted for insertion into a respective cooperable socket, a housing for housing the different pin assemblies, wherein the housing comprises a plurality of holes in a first face allowing deployment of the selected pin assembly therethrough;

an actuation mechanism cooperable with each pin assembly, wherein the actuation mechanism is adapted to selectively move each pin assembly between a stowed configuration in which the pins are stowed within the housing and a deployed configuration in which the pins protrude through the respective holes in the first face of the housing;

an output, wherein the output is electrically connected to each pin assembly in the deployed configuration; and wherein the dimensions of the adapter between the first face and the opposing face are less than 40 mm.

36. The multi-plug adapter as claimed in claim 35, wherein one of the pin assemblies comprises type-C pins and a pin support body and wherein the type-C pins are at least partially housed within the pin support body in the stowed configuration and wherein the type-C pins and the pin support body are deployable in tandem.

* * * * *